US012752506B2

(12) United States Patent
Oberholzner et al.

(10) Patent No.: US 12,752,506 B2
(45) Date of Patent: Oct. 6, 2026

(54) DEVICE AND METHOD FOR PRETREATING PACKAGING BLANKS AND PACKAGING DEVICE FOR PRODUCING PACKAGING UNITS

(71) Applicant: Krones Aktiengesellschaft, Neutraubling (DE)

(72) Inventors: Dominik Oberholzner, Brannenburg (DE); Frank Winzinger, Regensburg (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 19/243,911

(22) Filed: Jun. 20, 2025

(65) Prior Publication Data

US 2026/0014769 A1 Jan. 15, 2026

(30) Foreign Application Priority Data

Jul. 9, 2024 (DE) ..................... 10 2024 119 499.5

(51) Int. Cl.
*B31B 50/59* (2017.01)
*B31B 50/02* (2017.01)
*B65B 61/02* (2006.01)

(52) U.S. Cl.
CPC .......... *B31B 50/592* (2018.05); *B31B 50/022* (2017.08); *B65B 61/02* (2013.01)

(58) Field of Classification Search
CPC ...... B31B 50/592; B31B 50/022; B65B 61/02
See application file for complete search history.

(56) References Cited

U.S. PATENT DOCUMENTS 4,116,331 A * 9/1978 Curry .................... B65B 17/025 206/432
8,112,970 B2 * 2/2012 Marco .................. B65B 17/025 53/556
11,390,405 B2 * 7/2022 Spindler ................ B65B 41/02
12,206,290 B2 1/2025 Wisbar
(Continued)

FOREIGN PATENT DOCUMENTS

DE 102019128874 A1 * 4/2021 .......... B65B 17/025
DE 102020207931 A1 12/2021
(Continued)

OTHER PUBLICATIONS

Priority Application: DE 10 2024 119 499.5 filed Jul. 9, 2024: German Search Report dated May 9, 2025.
Extended European Search Report dated Mar. 13, 2026.

*Primary Examiner* — Lucas E. A. Palmer
(74) *Attorney, Agent, or Firm* — Simmons Perrine PLC

(57) ABSTRACT

An apparatus (6), as well as a method, for the pre-treatment of packaging blanks is disclosed (10). Each blank has through-openings for receiving articles (12) and for forming packaging units (18). A weakening of the at least one through-opening of the packaging blank (10) can be carried out by using at least two different expansion dies (44; 44*a*, 44*b*, 44*c*). The expansion dies (44; 44*a*, 44*b*, 44*c*) are each equipped with expansion tools with different opening widths and/or different contours for respectively influencing an extent of the weakening of the at least one through-opening. At least one handling robot (70, 88, 90, 108) serves to bring together the packaging blanks (10) with at least one of the at least two available expansion dies (44; 44*a*, 44*b*, 44*c*).

20 Claims, 16 Drawing Sheets

(56) References Cited

U.S. PATENT DOCUMENTS

| | | | | |
|---|---|---|---|---|
| 12,304,674 | B2 | 5/2025 | Luber et al. | |
| 2007/0042072 | A1 * | 2/2007 | Johns | B29C 43/36 425/394 |
| 2014/0148322 | A1 * | 5/2014 | Sireix | B31D 1/005 493/56 |
| 2020/0361645 | A1 * | 11/2020 | Spindler | B65B 35/30 |
| 2022/0234768 | A1 * | 7/2022 | Luber | B65B 17/025 |
| 2022/0348368 | A1 * | 11/2022 | Frederick | B65B 17/025 |

FOREIGN PATENT DOCUMENTS

| | | | | |
|---|---|---|---|---|
| WO | WO-2021240280 | A1 * | 12/2021 | B29C 49/4802 |
| WO | 2025190651 | A1 | 9/2025 | |

* cited by examiner 16, 32
34
14
d14
10

16, 32v
34
14v
d14v
10v 12, 22
24
10v
18

16, 32
14
d14
10

16, 32v
14v
d14v > d14
10, 10v

DEVICE AND METHOD FOR PRETREATING PACKAGING BLANKS AND PACKAGING DEVICE FOR PRODUCING PACKAGING UNITS

CLAIM OF PRIORITY

The present application claims priority to German Application DE 10 2024 119 499.5 filed Jul. 9, 2024, which is incorporated by reference.

FIELD OF THE INVENTION

The present invention relates to an apparatus and to a method for the pre-treatment of packaging blanks. The invention also relates to a packaging apparatus for producing packaging units that are formed by at least two articles and a packaging blank connected thereto.

BACKGROUND OF THE INVENTION

Different types of packaging are available for processing, assembling, grouping and packaging articles such as beverage containers. A frequently used variant consists, for example, of combining several identical articles or containers into portable, relatively handy pack units or packaging units. Various possibilities are known for combining multiple containers to form larger bundles, for example by combining and packaging four, six or even significantly more beverage containers using shrink film. The production of such bundles is usually essential because they are the most common variant of packaging units for beverage containers or bottles made of PET plastics. In some cases, these bundles are combined again for transport and/or assembled and palletized in layers.

The numerous production steps involved in using shrink film as packaging require a relatively high energy input, not least because the shrinking process of the film only takes place under increased heat. In addition, the film used incurs costs for production, provision, handling as well as later disposal, since it is no longer required after sale and the unpacking of the articles or containers. The machine configuration for providing the so-called film wrapping modules and other handling stations also incurs high investment costs. Finally, a relatively high investment of capital is also needed for the provision of the so-called shrink tunnel, with which the film wrapped around the bundle is shrunk around the containers by hot air application.

A variant in which the use of shrink films can basically be dispensed with are so-called strapping bundles. In this case, the containers are connected to one another by so-called strapping bands and combined into a bundle. In continuous or cyclically operating strapping machines, containers, articles or bottles are grouped into formations and are then strapped with one or more bands using strapping assemblies. Typical formations can be, for example, 1×2 arrangements (two containers in a row), 2×2 arrangements (four containers in a square or diamond formation), 3×2, 4×3 or in principle also variable n×m arrangements.

Furthermore, different variants of the use of packaging blanks to form bundles are known, wherein these packaging blanks usually consist of a pre-punched cardboard material. For example, the use of so-called top gripping cardboard packaging is known, with which it is possible to combine multiple bottles together via their neck regions by placing these gripping cardboard packagings from above onto the previously grouped articles.

Such a gripping cardboard packaging or such a packaging blank of cardboard normally has an arrangement and number of through-openings that correspond to the arrangement and number of articles or containers to be combined. The diameter of the through-openings is usually slightly smaller than the maximum diameter of the articles in an upper region in which the respective through-opening is ultimately to be positioned. The gripping cardboard packaging or the packaging blank is placed on the articles and pressed on so that a defined upper region of the articles is pushed through the through-openings. In particular, an upper region with a maximum diameter is pushed through the through-openings, and the edge regions of the through-openings are brought into engagement with the articles below this maximum diameter so that the gripping cardboard package or packaging blank is securely and firmly fixed to the articles.

However, in order to attach the gripping cardboard packaging or the packaging blank to the articles in this way, in particular to push the articles through the through-openings, relatively high application forces may be necessary, in particular in the case of larger groups of articles that are to be combined and packaged in this way. Accordingly, the articles must be able to withstand this application force so that they are not damaged upon applying the gripping cardboard packaging or the packaging blank.

In order to facilitate these application processes and to prepare the packaging blank in a suitable manner, WO 2021/043 362 A1 proposes a packaging apparatus and a method for producing packaging units in which multiple articles are combined by a secondary packaging. The secondary packaging is formed in this case by a flat packaging blank which is applied to prepared article groupings in the manner described above. By forming, the packaging blank is transformed from a flat storage state into a three-dimensional state for sale. However, this forming may however also include widening of edge regions of the through-openings, which can be carried out in particular with suitable forming devices. As forming devices, for example so-called breaking cones or expansion cones are proposed, the arrangement of which to each other corresponds to the arrangement of the through-openings of the packaging blank.

A packaging apparatus and a method for producing packaging units are also known from WO 2020/233 943 A1. Here as well, a pre-treatment of a packaging blank serving as packaging material is provided before it is pressed onto several articles to combine them. A pre-treatment module is equipped with an expansion die that is configured to reduce the resistance forces in the edge regions of the through-openings of the packaging blank during the subsequent application of the packaging blank on the articles. In this known expansion die as well, multiple expansion or breaking cones are in an arrangement relative to each other that corresponds to the arrangement of the through-openings in the packaging blank.

All known expansion dies represent format parts that must be exchanged for different article or container formations or, when used for differently dimensioned articles or containers, for expansion dies that are adapted to the changed requirements.

SUMMARY OF THE INVENTION

However, since such a conversion usually results in a plant stoppage as well as the time required for the conversion, and a certain cost expenditure due to the manual interventions in the packaging plant that are normally necessary, it can be considered the primary object of the present invention to reduce or completely eliminate these disadvantages and to offer an improved option of being able to process different article or container formations and/or different article or container dimensions without having to completely exchange the corresponding pre-treatment tool for this purpose.

This object of the invention is achieved with the subject matter of the independent claims. Features of advantageous developments of the invention are also found in the dependent claims.

In order to achieve at least parts of the stated object, the present invention proposes an apparatus for the pre-treatment of packaging blanks having the features of the independent claim. The packaging blanks each have at least one through-opening within a flat region for receiving at least one article to form a packaging unit comprising the at least one article and the packaging blank connected thereto. In many cases, however, the packaging blanks each have, within their flat region, at least two similar and, in particular, equally large through-openings for receiving at least two similar or identical articles to form a packaging unit, comprising the at least two articles and the packaging blank associated therewith.

When packaging blanks as well as packaging units equipped therewith are mentioned herein, they include both the variant with only one article and the variant with a plurality of combined articles within the respective packaging unit.

The packaging blanks can each have exactly four, six or eight through-openings for articles. Preferably, the packaging blanks each have more than three through-openings for articles.

Preferably, all material of the packaging blank, in a state placed on the article, is located in only one plane, except for bent fixing tabs and/or handle openings. Plane here does not mean the mathematical plane, but rather a flat region that has the thickness of the cardboard from which the blank was cut or pressed.

In other words, the blank only holds the articles together on one plane.

In another embodiment, the blank may have more through-openings than there are articles in the subsequent bundle, in particular exactly twice or three times as many. In particular, in this embodiment, the blank holds the articles together on two or more planes. In other words, an article, preferably all of them, penetrates the blank at least twice.

In particular, the blank can be folded once or more before being placed on the article, in particular in order for the through-openings to be aligned.

In particular, the device can have an additional folding tool for this purpose, which can be approached by the same handling devices or by additional handling devices.

In another embodiment, an edge region of the blank, which is bent substantially by 90°, encloses the articles of the bundle from the side. In this variant, the articles may only penetrate the blank once, but are held together over a greater height by the peripheral wide edge. In this variant, the articles may only go through the blank once, but are held together over a greater height by the peripheral wide edge.

This apparatus according to the invention, which in the present context is also referred to as a pre-treatment module, which is a component of a packaging machine, comprises at least two different expansion dies, each of which is provided and accordingly equipped for weakening edge regions, possibly also for widening the at least one through-opening or the multiple through-openings of the packaging blank. These at least two expansion dies are each equipped with expansion tools with different opening widths and/or different contours for the respective influencing of the extent of the weakening and/or widening of the through-opening.

Furthermore, with the device according to the invention, it is provided that it is equipped with at least one handling robot for the respective bringing together of the packaging blank with at least one of the at least two available expansion dies.

In this case, with the apparatus, it can optionally be provided that the at least one separate handling robot is assigned to each of the at least two different expansion dies for the respective bringing together of the packaging blank to be pre-treated with one of the at least two available expansion dies. Each of these handling robots can at least be provided and correspondingly equipped to remove packaging blanks from a magazine and to bring them together individually with the expansion die assigned thereto, i.e. usually press them on there in order to widen the through-openings in the desired manner and to pre-treat the packaging blanks in such a way that they can be applied to the provided article groupings with reduced joining force.

Alternatively, however, with the apparatus, it can also be provided that at least one common handling robot is assigned to the at least two different expansion dies for the respective bringing together of the packaging blank to be pre-treated with one of the at least two available expansion dies. In this case, the top gripping handling robot can be provided and correspondingly equipped to remove packaging blanks from two different magazines and to bring them together individually with the appropriate expansion die, i.e. usually to press them on there in order to widen the through-openings in the desired manner and to pre-treat the packaging blanks in such a way that they can be applied to the provided article groupings with reduced joining force.

Typically, each of the at least two expansion dies is equipped with a plurality of, in particular, similar and identically dimensioned expansion tools, wherein these expansion tools form the pre-treatment elements for widening and/or expanding the through-openings of the packaging blanks pressed onto the expansion die.

In order to be able to process different types of packaging blanks, the expansion tools of different dies are each dimensioned differently and are provided for the pre-treatment of different packaging blanks. Accordingly for example, the diameters of the expansion tools of a first die can be larger than the diameters of the expansion tools of a second die since the packaging blanks can for example have differently sized through-openings for differently dimensioned articles.

With the device according to the invention, each of the at least two different expansion dies can be assigned to a pre-breaking station for the pre-treatment of different packaging blanks and thus each form a part of this pre-breaking station. Optionally, the magazines assigned to the respective expansion dies for providing the packaging blanks can also be considered as part of these pre-breaking stations.

According to a further equipment option, at least one of the pre-breaking stations can be equipped with a pivoting or rotatable tool carrier, whereby at least two different expansion dies can be brought into engagement with the packaging blanks as active expansion dies, while the expansion die or multiple expansion dies not required are moved out of the engagement region and can be kept ready for later use.

According to a further equipment variant, the device according to the invention can have at least one separate handling robot which can be arranged between the at least two pre-breaking stations and a provisioning station and/or a conveyor device with prepared article groupings located there, and which is provided and accordingly equipped for transferring packaging blanks pre-treated in the pre-breaking stations to the article groupings and for applying the pre-treated packaging blanks no the article groupings.

Alternatively to this, a separate handling robot can be arranged between each of the at least two pre-breaking stations and the provisioning station and/or the conveyor device with the prepared article groupings located there, which handling robot is provided and accordingly equipped for transferring packaging blanks pre-treated in the different pre-breaking stations to the article groupings and for applying the pre-treated packaging blanks on the article groupings.

It should be mentioned that the pre-breaking stations described above are each equipped with at least one expansion die, which expansion dies are equipped with a plurality of expansion tools. In addition, the expansion die forms part of this pre-breaking station as an exchangeable component. The expansion dies can therefore each be considered as separate components that can be selected from a plurality of differently constructed and configured expansion dies and inserted into the packaging apparatus to equip and adapt to different products to be processed. If a product change is pending, either an expansion die already located in the packaging apparatus can be used as the active expansion die, or a new expansion die can first be inserted into the packaging apparatus which can then be used for the pre-treatment of the packaging blanks.

All these different expansion dies can optionally also be regarded as components to be retrofitted.

To achieve the above-mentioned object, the invention further proposes a method for the pre-treatment of packaging blanks having the features of the independent method claim. The packaging blanks to be pre-treated using the method each have at least one through-opening within a flat region, which serves to receive at least one article to form a packaging unit, wherein the packaging unit comprises the at least one article and the packaging blank connected thereto.

The method provides a pre-treatment of the packaging blank, which means a weakening of the at least one through-opening to reduce a joining force when applying the packaging blank on the at least one article passing through the through-opening, using an expansion die. Such a weakening can for example also mean a pre-expansion of the at least one through-opening at its edge. An opening width and/or an extent of weakening or widening of the through-opening during pre-treatment of the packaging blanks is specified by a selection and the use of at least one of at least two different dies, each with different contours and/or expansion dimensions. This means a selection of at least two available dies for the respective expansion or weakening process, wherein at the same time, both dies can however be available for the pre-treatment process.

In the method, it can be provided that the at least two different expansion dies are each brought together with packaging blanks to be pre-treated by at least one separate handling robot.

Alternatively, the method can also provide that the at least two different expansion dies are brought together by a common handling robot in each instance with packaging blanks to be pre-treated.

Preferably, each of the at least two expansion dies is equipped with a plurality of pre-treatment elements, i.e. in particular with similar and identically dimensioned expansion tools, wherein the plurality of expansion tools of different dies are each differently dimensioned and are provided for the pre-treatment of different packaging blanks.

Each of the at least two different expansion dies can be assigned to a pre-breaking station for the pre-treatment of different packaging blanks, and thus each form a part of this pre-breaking station.

In addition, the method can provide that the packaging blanks pre-treated in the pre-breaking stations are transferred by at least one separate handling robot from the at least two pre-breaking stations to a provisioning station and/or a conveyor device with prepared article groupings located there and are applied there to the article groupings, wherein each of the separate handling robots can access the one of the at least two pre-breaking stations to which it is assigned.

A variant of the method is also conceivable in which the packaging blanks each pre-treated in the pre-breaking stations are transferred by at least one common handling robot from the at least two pre-breaking stations to a provisioning station and/or a conveyor device with prepared article groupings located there and are applied there to the article groupings, wherein the common handling robot can selectively access one of the at least two pre-breaking stations.

The method can optionally provide that different packaging units can be produced during a production run and are equipped with differently configured and/or pre-treated packaging blanks.

Alternatively, it can also be provided in this regard that during a production run, identical packaging units are produced which are equipped exclusively with packaging blanks of the same structure and/or pre-treated within one of a plurality of pre-breaking stations.

Finally, to achieve the above-mentioned object, the invention proposes a packaging apparatus for producing packaging units, which packaging units are formed by at least one article and a packaging blank connected thereto, wherein the at least one article, when connected to the packaging blank, passes at least partially through a through-opening in a flat region of the packaging blank.

This packaging apparatus according to the invention comprises at least one feed device for the at least one article or for combinations of a plurality of grouped articles, a pre-treatment module for pre-treatment of the packaging blanks for application to the at least one article, as well as a packaging module for applying and securing the pre-treated packaging blank to the at least one article.

It is provided that the pre-treatment module comprises at least two expansion dies, each with differently dimensioned and/or contoured expansion tools for influencing the respective extent of weakening of the through-opening, which are each provided for weakening the at least one through-opening of the packaging blank and are accordingly equipped, and wherein the pre-treatment module comprises at least one handling robot for the respective bringing together of the packaging blank with at least one of the at least two available expansion dies.

In the packaging apparatus, the at least one handling robot can in particular form an equipment element of the apparatus, or it can be assigned to this apparatus.

In addition, in the packaging apparatus, an optical sensor device with downstream image analysis for monitoring the applications and/or the application results of the packaging blanks on the article groupings can be assigned to the provisioning station, and/or the conveyor device with the article groupings located there and to be equipped with packaging blanks, and/or the packaging units already equipped there with packaging blanks. A camera with appropriate image analysis is suitable for this purpose.

Furthermore, the packaging apparatus according to the invention can be coupled or equipped with a control center which serves to control various system functions and which is coupled to a data storage device which collects and keeps available sensor data that is obtained in the packaging apparatus and which can also provide stored sensor data and/or operating and system parameters of the packaging apparatus for influencing system functions. The data storage device can, for example, comprise a database which in turn may be outsourced or partially outsourced to a data cloud. The database can keep numerous parameters available, for example for inputting appropriate angles for the deformation of the tabs on the inside of the through-openings and/or appropriate force values of the motors that are provided for applying the packaging blanks to the article groupings. In this case, the different types of containers, the manufacturers and available material data of the packaging blanks, the material thicknesses of the packaging blanks, etc. can also be taken into account, from which useful values for setting the threshold and target values of the packaging system, but also for other system components, can be calculated. In principle, the principles of machine learning can also be taken into account in all of these database accesses and calculations.

It should be expressly mentioned at this point that all aspects and embodiment variants that have been explained in conjunction with the packaging and/or pre-treatment apparatus according to the invention can equally relate to, or form, partial aspects of the method according to the invention for pre-treating packaging blanks. Therefore, when at any point in the description or in the claim definitions of the packaging or pre-treatment apparatus according to the invention certain aspects and/or correlations and/or effects are mentioned, this applies equally to the method according to the invention. The same applies vice versa, so that all aspects and embodiment variants which have been explained in connection with the method according to the invention for the pre-treatment of the packaging blanks can also relate to, or be, partial aspects of the packaging apparatus according to the invention and/or of the pre-treatment apparatus according to the invention. Therefore, when at any point in the description or also in claim definitions of the method according to the invention certain aspects and/or correlations and/or effects are mentioned, this applies equally to the packaging apparatus according to the invention as well as to the apparatus according to the invention for the pre-treatment of packaging blanks.

The following explanations summarize in addition some aspects of the invention already explained in various embodiment variants and draw attention to further connections. Some aspects are specified, although these should not be considered to be in contradiction with the statements already made, but rather as a summary and/or, in case of doubt, as more specific variants and/or modifications. Thus, as already mentioned several times above, the process steps carried out using the method, the pre-treatment module and/or the packaging apparatus for the pre-treatment of already-produced packaging units are in particular aimed at reducing the application force that is necessary to attach a gripping cardboard packaging to a group of articles. The packaging units produced in this application step comprise at least two articles or containers on which at least one packaging blank is arranged which is at least partially flat, wherein the packaging blank has at least one through-opening for the at least two grouped articles in the flat region.

The articles or containers can be beverage containers, for example, in particular bottles made of PET or of another suitable plastics material. Preferably, the articles or containers can also be formed by cans made of plastics material and/or aluminum or another metal or the like. However, the packaging apparatus is also suitable for arranging a corresponding packaging blank on other suitable articles or containers and fixing them thereto.

The flat packaging blank can be made in particular from recyclable cellulose-containing materials. The flat packaging blank can be made in particular of paperboard material and/or cardboard material which can be easily recycled after use. Furthermore, it is conceivable that the flat packaging blank is made of plastics material, wherein in particular pure thermoplastics materials may be used which are also easy to recycle.

It can also be provided that the flat packaging blank has multiple recesses which can together form a carrying handle.

The flat packaging blank can optionally be made up of multiple cellulose-containing layers or of a combination of different materials, as well as different recycled materials.

The packaging blanks can each have exactly four, six or eight through-openings for articles. Preferably, the packaging blanks each have more than three through-openings for articles.

Preferably, all material of the packaging blank, in a state placed on the article, is located in only one plane, except for bent fixing tabs and/or handle openings. Plane here does not mean the mathematical plane, but rather a flat region that has the thickness of the cardboard from which the blank was cut or pressed.

In other words, the blank only holds the articles together on one plane.

In another embodiment, the blank may have more through-openings than there are articles in the subsequent bundle, in particular exactly twice or three times as many. In particular, in this embodiment, the blank holds the articles together on two or more planes. In other words, an article, preferably all of them, penetrates the blank at least twice.

In particular, the blank can be folded once or more before being placed on the article, in particular in order for the through-openings to be aligned.

In particular, the device can have an additional folding tool for this purpose, which can be approached by the same handling devices or by additional handling devices.

In another embodiment, an edge region of the blank, which is bent substantially by 90°, encloses the articles of the bundle from the side. In this variant, the articles may only penetrate the blank once, but are held together over a greater height by the peripheral wide edge.

A packaging apparatus for producing packaging units comprises at least one feed device for the one article to be packaged or for combinations of multiple articles, a pre-treatment module for preparing the packaging blank for application to the at least one article, and at least one packaging module for applying and fixing the packaging blank to the article groupings. It is provided that the pre-treatment module comprises at least one device which is configured to reduce a resistance force in an edge region of the at least one through-opening of the packaging blank during the subsequent application of the packaging blank to the at least one article.

The smallest variant of the packaging units produced in this way consists of at least one article or container which is equipped with at least one first secondary packaging in the form of a flat packaging blank. All features described here with regard to such packaging units can therefore in principle be read as applying to packaging units that comprise only one article and one packaging blank arranged thereon. However, all features described here with regard to such packaging units are also to be applied analogously or in a correspondingly adapted manner to such packaging units which comprise two or more articles and a packaging blank arranged thereon. In this case, it may be a packaging blank configured as a carrying handle blank that provides a carrying handle, but this is not described in more detail here.

In addition, it is possible for the articles or containers of the packaging units to be additionally combined by a second secondary packaging or by a tertiary packaging. For example, such a second secondary packaging or tertiary packaging can be formed by at least one band-like, or strip-like, closed strapping which is stretched horizontally around an outer side of the articles or containers and which is optionally firmly fixed to at least one of the articles at a contact point.

Typically, after the packaging blank has been fixed, a defined upper region of the articles is located above the packaging blank while a defined lower region of the articles is arranged below the packaging blank. In a preferred embodiment, less than one-fifth of the volume of the articles is located above the uppermost (if there are more than one) through-openings of the blank. In particular, a pouring opening for the articles is also arranged above the uppermost through-opening.

As will be explained in the context of the present description on the basis of various embodiment variants, the through-openings of the packaging blank have, in particular, suitable fixing devices which can be formed for example by fixing tabs.

For example, the fixing tabs are formed by notches or the like extending radially from the openings.

After the packaging blank has been arranged on and fastened to the articles, the packaging blank is in engagement with the articles in particular in such a way that it is substantially immovably fixed to the articles, and the articles can no longer make any significant relative movements or changes in position relative to one another and relative to the packaging blank—this applies in the plane in which the packaging blank is arranged. If the blank is a cardboard blank of a small thickness, it can be that after fixing the blank, the blank is itself bendable, and the articles are therefore movable towards each other along their longitudinal axes or in the insertion direction through the through-openings. It can also still be possible to rotate the articles about their longitudinal axis as well as about another axis perpendicular to the longitudinal axis. In particular, the attachment of an additional secondary packaging can be useful for the latter possibility.

The packaging blank can in particular be removed from the articles in the article group again only under increased exertion of force with a force component directed upward, wherein the packaging blank is generally destroyed at least partially or regionally.

The packaging apparatus comprises at least one feed device via which the at least one article, but typically the at least two articles, are fed. Preferably, the articles are already assembled in advance in a suitable number and arrangement as article groups, and these article groups are fed to a packaging module via the at least one feed device. In the packaging module, a packaging blank is applied and fixed to the article group. For this purpose, a packaging blank is taken from a magazine and prepared in a pre-treatment module for application to the at least two articles of the article group. For this purpose, the pre-treatment module comprises at least one device which is configured to reduce a resistance force in an edge region of the through-openings of the packaging blank during the subsequent application of the packaging blank to the at least two articles.

For this purpose and according to the present invention, the device of the pre-treatment module comprises at least one expansion die, optionally a plurality of expansion dies, which is/are in particular suitable for expanding and/or widening the edge regions of the at least one through-opening in the described manner. In this case, the pre-treatment increases the average diameter of the through-openings at least slightly. As a result, an upper region of the articles having a maximum diameter, which maximum diameter is preferably at least slightly larger than an average diameter of the through-openings, can be more easily passed through the given through-opening.

In particular, the application force with which the respective packaging blank is pressed onto the articles so that the upper region of the articles with a maximum diameter is arranged above the packaging blank and the lower region of the articles is arranged below the packaging blank can thus be reduced at least slightly, preferably significantly, compared to an application force that would be necessary to fix a packaging blank to the articles without pre-treatment. This also reduces the risk of the items being damaged when applying the packaging blank compared to conventional packaging apparatuses and methods. In this case, even articles that have a smaller wall thickness can be used without being damaged when applying the packaging blank.

During pre-treatment, the packaging blank is pressed against the expansion dies so that the expansion tools of the expansion dies each engage through the through-openings regionally, and in so doing engage in particular with the edge regions of the through-openings. This causes an expansion or other modification of the edge regions of the through-openings.

In particular, the material is weakened in the edge regions of the through-openings. Preferably, the expansion dies increase the average diameter of the through-openings.

In particular, during the pre-breaking, a still-existing connection between tabs arranged in the edge region of the through-openings can be torn open or broken at least regionally and/or in part (some tab connections, but not all tab connections).

In particular, predetermined breaking points can be arranged between adjacent tabs already during punching. These can be incorporated in the blank, for example, in the form of scoring lines or punchings when producing the blank.

In particular, a tab is substantially trapezoidal, wherein in particular one or two lines of the trapezoid may be slightly curved. The curves can have the center of the through-opening as the center of the radius.

The expansion tools of the expansion die can, for example, be conical or frustum-shaped, wherein the cone tip or the cone side with the smaller cross-sectional area points upwards. In this case, the expansion dies can be suitable for different article sizes. Depending on the average diameter of the through-openings, the packaging blank can be pressed downwards far enough to widen the through-openings in the desired manner.

The expansion tools can be made substantially trapezoidal in cross section regionally along their longitudinal axis.

The arrangement, number and positioning of the expansion tools on the respective expansion dies corresponds to the arrangement, number and positioning of the through-openings of the packaging blank. The exchangeable and/or activated expansion dies can therefore be used to provide the appropriate expansion tools, wherein the expansion dies can be quickly and easily adapted to a provided product change without complex retooling measures being necessary for this.

When pre-treating the packaging blanks, it can be provided in particular that an average diameter of the openings is enlarged during the pre-treatment.

In particular, it can be that fixing tabs formed in the respective edge regions of the openings are bent over at least regionally, so that the fixing tabs subsequently protrude from a plane in which the openings are arranged.

BRIEF DESCRIPTION OF THE FIGURES

Exemplary embodiments of the invention and their advantages are explained in more detail below with reference to the accompanying figures. The proportions of the individual elements relative to one another in the figures do not always correspond to the actual proportions, since some forms are simplified, while other forms are shown enlarged in relation to other elements for better illustration.

DETAILED DESCRIPTION OF THE INVENTION

The following description of the figures generally uses the same reference signs for elements of the invention that are identical or have the same effect. Furthermore in many cases for the sake of clarity, in the individual figures, only reference signs that are necessary for the description of the figure in question are shown. The illustrated embodiments are merely examples of how the apparatus according to the invention or the method according to the invention for pre-treatment packaging blanks can be configured and do not represent a definitive limitation. The features described below in each instance are also not to be understood in close connection with further features of the particular exemplary embodiment, but can be provided in each instance in a general context or used for this purpose.

Figure 1:
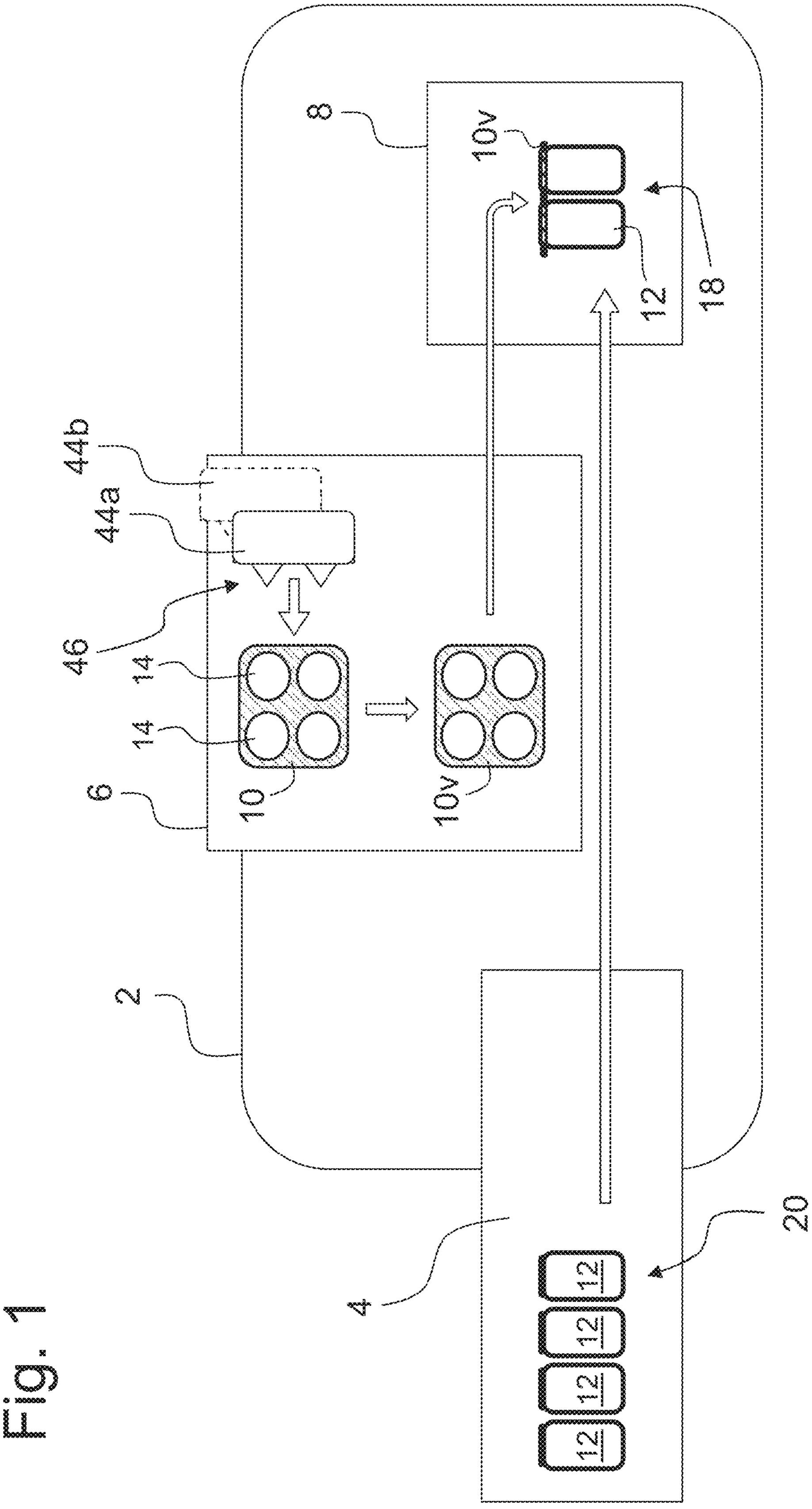
FIG. 1 shows a schematic view of an embodiment variant of a packaging apparatus according to the invention, which serves to package articles using packaging blanks.

The schematic representation in FIG. 1 is intended to first illustrate the basic components and the process steps to be carried out with them in and for the production of packaging units. For this purpose, a packaging apparatus 2 is used with which packaging units 18 can be produced which are formed by at least two articles 12 and a packaging blank 10 connected thereto (see FIG. 2D), wherein at least portions of the at least two articles 12, when they are connected to the packaging blank 10, each pass via through-openings 14 in a flat region of the packaging blank 10 (see FIG. 2A).

The packaging apparatus 2 comprises at least one feeding device 4 for the at least two articles 12, wherein these two or more articles 12 can be fed to the packaging apparatus 2 in particular in a grouped form, i.e. as an article grouping 20.

Furthermore, the packaging apparatus 2 comprises a pre-treatment module 6 for pre-treatment of the packaging blanks 10 in order to prepare them for application to the at least two articles 12 or to the article grouping 20. To clarify that the packaging blanks 10 are prepared in this way for application to the articles 12, they are identified with the reference sign 10*v* in the following description as well as in the drawing.

This pre-treatment module 6 is equipped with at least two different expansion dies 44*a* and 44*b* (see FIGS. 6 to 11 in this regard) which are provided for widening the at least one through-opening 14 of the packaging blank 10 and are each equipped with at least two expansion tools 46 (see also FIGS. 6 to 11). As is illustrated in more detail in FIG. 6 et seq., the at least two expansion tools 46 of each of the at least two different expansion dies 44*a* and 44*b* are either differently dimensioned and/or equipped with different relative positions to one another or with different spacings from one another in order to adapt to through-openings 14 positioned different from each other within different models of packaging blanks 10 so that by using one of the at least two existing expansion dies 44*a* or 44*b*, different packaging blanks 10 can be pre-treated, as will be explained in more detail below.

What is merely indicated in FIG. 1 is the possibility of selecting one of the at least two existing expansion dies 44*a* or 44*b* as the active expansion die 44 which can be used for the pre-treatment of the packaging blanks 10, while the other expansion die 44*b* or 44*a* remains inactive and can be kept ready for later use as the active expansion die 44. In the described case, the first expansion die 44*a* is intended to form the active expansion die 44 while the second expansion die 44*b* is inactive and is therefore shown with broken lines.

Different variants of such a selection and the devices or manipulators used for this purpose are illustrated in more detail in FIGS. 8A to 11 and will be described below with reference to FIGS. 8A to 11.

In addition, the packaging apparatus 2 comprises a packaging module 8 for applying and fixing each of the pre-treated packaging blanks 10*v* to the at least two articles 12 of the respective article grouping 20, whereby these are each combined to form packaging units 18. These packaging units 18 normally produced in large numbers in a continuous production sequence by the packaging apparatus 2 can then be subjected to further processing, for example repackaging with tertiary packaging and/or combined into palletizable layer arrangements in order to stack them on top of one another and palletize them.

With reference to the schematic views of FIGS. 2A to 2E, the essential principles for combining article groupings 20 by attaching a packaging blank 10 will also first be explained before further special features of the present invention are clarified in the further figures, i.e. in FIGS. 3A to 11.

Figure 2B:
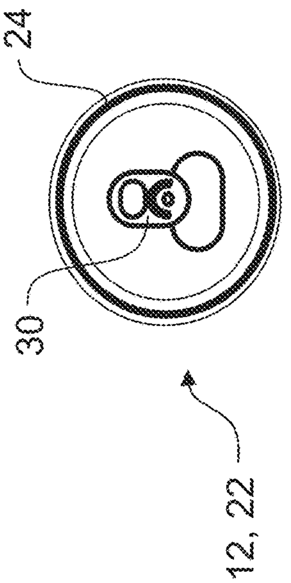
FIGS. 2A to 2E show, in various schematic views, successive process steps that take place one after the other during the application of packaging blanks to grouped articles.
Figure 2D:
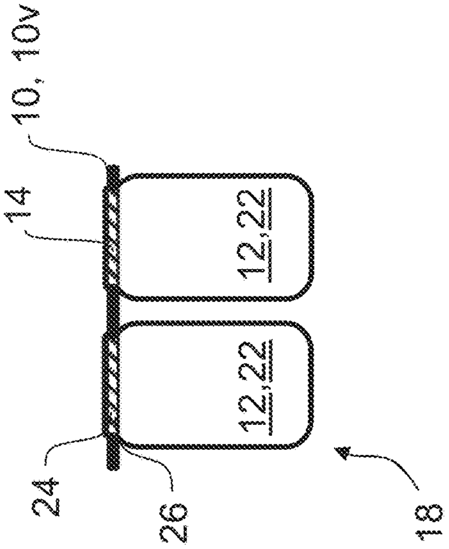
Figure 2A:
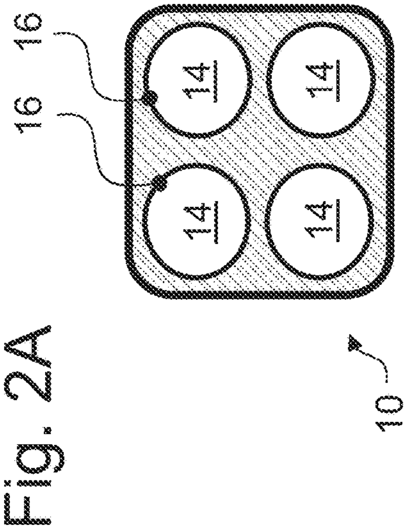

The schematic plan view of FIG. 2A illustrates a first embodiment variant of a packaging blank 10 as can be used to combine articles 12 (see FIG. 2B), in that these articles 12 pass with their shell surfaces through through-openings 14 accordingly provided for this purpose and are locked to the edge regions 16 of the through-openings 14.

Figure 2C:
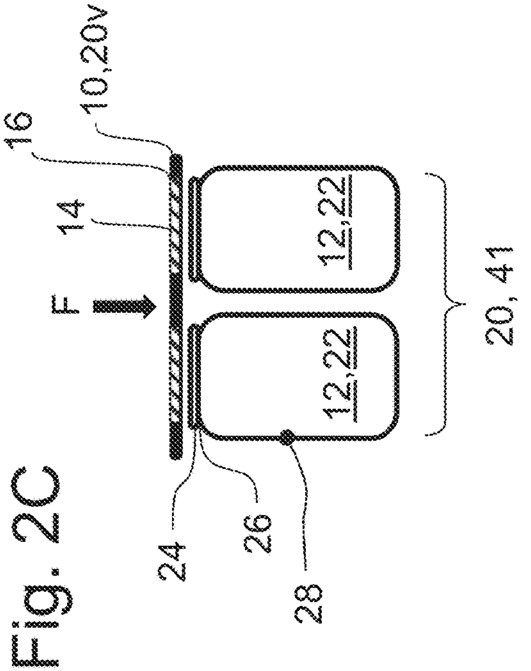

In addition, the schematic plan view of FIG. 2B shows an article 12 from above which can be combined with a plurality of other similar or identical articles 12 by the packaging blank 10 according to FIG. 2A to form a packaging unit 18 (see FIG. 2D) or to form a bundle. The schematic side views of FIGS. 2C and 2D schematically show the application of such a packaging blank 10 to a combination of articles 12 according to FIG. 2B. Such a combination of different sizes that are adapted in each instance to the packaging blank 10 with which the articles 12 are equipped in terms of the number and arrangement of the articles 12 contained therein, is also referred to in the present context as the article grouping 20.

Preferably, the articles 12 can be beverage containers in the form of bottles or cans 22 made of plastics material and/or aluminum or of another suitable metal or material. However, the packaging apparatus and the method for producing packaging units 18 explained in more detail below are also suitable for arranging a corresponding packaging blank 10 on other suitable articles 12 and fixing it thereto. In addition to the shown cans 22, these can also be, for example, mineral glass bottles, PET beverage containers, or similar.

The articles 12 typically have an annular widening in the upper region to which the packaging blank 10 can be fixed, in particular by a latching process. In particular, the cans 22 have an annular lid rim 24. Below this lid rim 24, the cans 22 have an at least slight taper 26 or constriction 26 of smaller diameter than the lid rim 24. As suggested from the schematic side view of FIG. 2C, the constriction 26 located below the lid rim 24 has a slightly smaller diameter than the shell surface 28 of the respective can 22 located below the constriction 26, and also a smaller diameter than the lid rim 24 located above the constriction 26.

The cans 22 can in particular be beverage cans conventionally known from the prior art, which in the present context can also be designated by the reference sign 22.

It is preferably provided that the packaging blank 10, after being applied to the combination or grouping 20 of at least two such cans 22, is fixed to the cans 22 below the lid rim 24, so designated here, in the region of the taper 26 or constriction 26. Thus, after the packaging blank 10 has been applied to the articles 12 formed by the cans 22, a sub-region of these articles 12 or cans 22 is located above the packaging blank 10, namely in particular the can lid with the can closure 30 illustrated in FIG. 2B, while the remaining region of the articles 12 or cans 22, including their respective shell surface 28, is located below the packaging blank 10. In particular, it is provided that the packaging blank 10 is fixed in this position by the articles 12 or cans 22 and that, conversely as well, the articles 12 or cans 22 are fixed by the packaging blank 10.

If, for example, the articles 12 are bottles made of PET or another suitable plastics material with a screw closure, the bottle has a regional widening below the screw closure, in the form of the so-called neck ring (not shown here). Below the neck ring, the diameter of the bottle is again regionally smaller and widens from there downwards into the jacket region. In particular, it is provided that the packaging blank 10, after being applied to a combination of bottles, is fixed below the so-called neck ring of the closure region of the bottles. Thus, after the packaging blank 10 has been applied to the bottles, the closure region and the neck ring of the bottles are located above the packaging blank 10, while the remaining region of the bottles is located below the packaging blank 10.

The packaging blank 10 is preferably substantially flat and has the circular through-openings 14 for the articles 12 or cans 22, which can be seen in FIGS. 2A, 2C, and 2D. The packaging blank 10 is configured such that it can be slipped or pressed onto the articles 12 or cans 22 from above, wherein the articles 12 pass at least partially through the through-openings 14 so that after the packaging blank 10 has been attached to an article grouping 20, the articles 12 are regionally located above and regionally below the packaging blank 20.

After the packaging blank 10 has been fixed, a defined upper region of the articles 12 or cans 22 is located above the packaging blank 10, while a defined lower region of the articles 12 or cans 22 is arranged below the packaging blank 10. In particular, an edge region 16 bordering the through-openings 14 rests against the outer shell surface 28 of the articles 12 or cans 22, as is illustrated by the example of a packaging unit 18 formed in this way in FIG. 2D.

Preferably, the through-openings 14 of the packaging blank 10 can have suitable fixing devices which can be formed for example by fixing tabs so designated here. Such fixing tabs can be formed by incisions extending radially from the through-openings 14, which however are not shown in FIG. 2A. However, FIGS. 3A to 3E clearly show these fixing tabs.

After the packaging blank 10 has been arranged on and fastened to the articles 12 formed by the cans 22, the packaging blank is in engagement with the cans 10 in such a way that the packaging blank 10 is secured to the cans 22 in a substantially stationary manner, and the cans 22 can no longer make any significant relative movements or changes in position relative to one another as well as relative to the packaging blank 10.

As a result, the packaging blank 10 can be removed from the articles 12 or cans 22 of the article grouping 20 only by applying increased force with a force component pointing away from the articles 12, i.e. directed in particular upward, wherein the packaging blank 10 is generally at least partially destroyed.

Such packaging blanks 10, as shown here, are also referred to as top gripping cardboard packaging. In principle, the packaging blanks 10 can also be regarded as secondary packaging for combining a plurality of primary packagings, namely the cans 22.

Figures 3A, 3B, 3C, 3D, 3E:
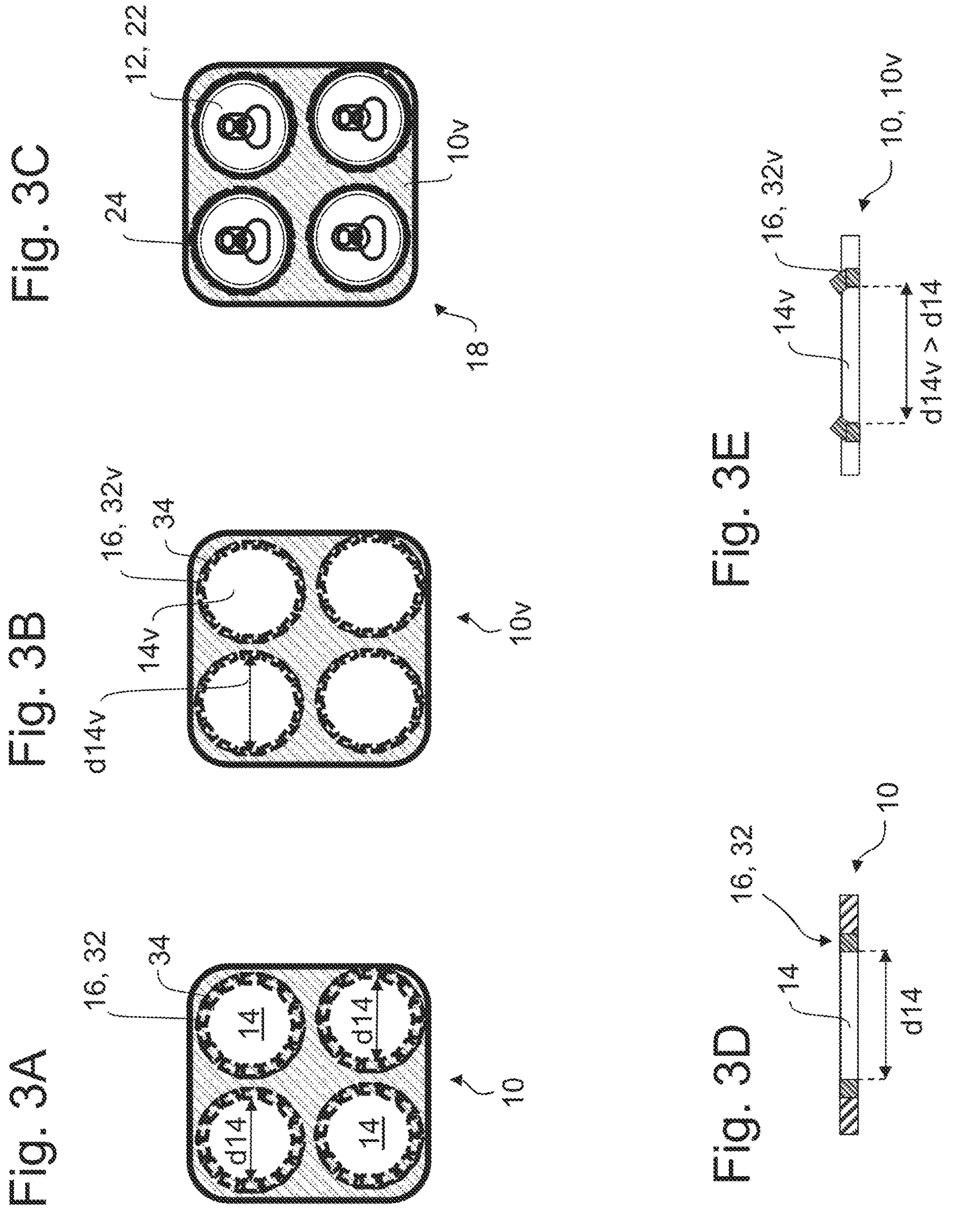
FIGS. 3A to 3E show, in further schematic views, multiple process steps in a first variant of the pre-treatment of packaging blanks which are subsequently applied to article groupings.

The packaging blank 10 preferably consists of a suitable cardboard material, a plastics material, a cardboard-plastics composite material, or the like, which is normally formed into the shape shown in FIGS. 2A and 3A by a punching process.

To produce a packaging unit 18 (see FIG. 2D), a packaging blank 10 is pre-treated in a suitable manner in order to reduce a resistance force of the packaging blank 10 in the edge regions 16 bordering the through-openings 14 when the packaging blank 10 is applied to the at least two articles 12 or cans 22. The pre-treated packaging blank 10 is also designated below with the specifying reference sign 10*v*, to clarify that the packaging blank 10 has been subjected to the pre-treatment steps explained below.

The pre-treated packaging blank 10*v* is placed on a corresponding combination or article grouping 20 of at least two articles 12 and, according to FIG. 2C, is pressed at least partially onto the articles 12 of the article grouping 20 by an application force F directed at least partially downwards or parallel to the longitudinal axes of the upright articles 12 or cans 22, in particular by a pressure force exerted as uniformly as possible downwards on the upper side of the pre-treated packaging blank 10*v*, and is thereby fixed to the articles 12 or cans 22.

Due to the pre-treatment already mentioned and explained in more detail below and the resulting decreased resistance force, the application force F can be significantly reduced compared to the pressure force required for an untreated packaging blank 10. This makes it possible to also attach packaging blanks 10*v* to articles 12 which, for example, have a smaller wall thickness and are therefore less stable against exerted compressive forces and are thereby at risk of buckling. In this way, the material consumption for the articles 12 can be reduced since even thinner-walled and mechanically less stable articles 12 can be combined using such a packaging blank 10 or 10*v*.

In addition, due to the advantageous reduction of the resistance force and thus of the application force F, it is possible to apply multiple packaging blanks 10*v* simultaneously or almost simultaneously to larger groupings 20 of upright articles 12 or beverage cans 22 and thus to increase the machine performance of a packaging machine involved in this process.

Figure 2E:
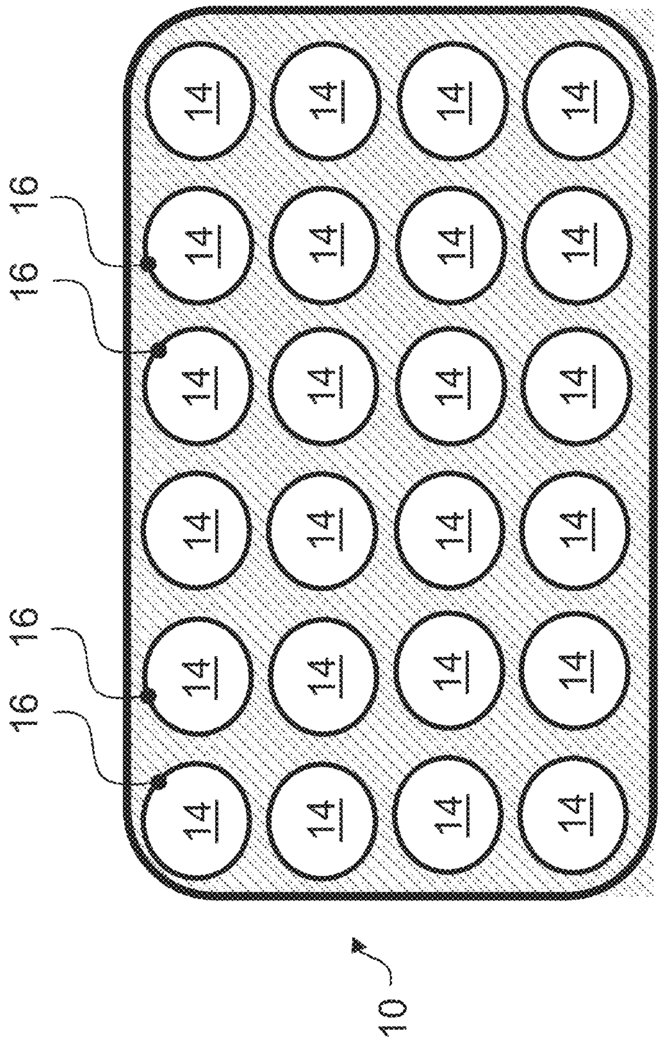

Since FIG. 2A shows, by way of example, a small-area packaging blank 10 with only four through-openings 14 punched therein in a rectangular arrangement for combining an article grouping 20 with only four articles 12 or cans 22, it should be pointed out with reference to FIG. 2E that such packaging blanks 10 can also be considerably larger and can, for example, be suitable for combining article groupings 20 of twenty-four or more articles 12 or cans 22 in the described manner.

Thus, the packaging blank 10 shown in FIG. 2E has four rows arranged side by side or one below the other, each with six through-openings 14, which are also arranged in a rectangular arrangement, as already shown by way of example in FIG. 2A. However, this does not exclude other arrangements of the articles 12 relative to one another so that they can for example optionally also be grouped in a close spherical packing or hexagonal arrangement, wherein the contact lines of the articles 12 to one another can be connected to one another in triangles, in a plan view.

Furthermore, it is also conceivable to make the packaging blanks 10 significantly larger than is shown by way of example in, e.g., FIG. 2E.

In this context, reference is additionally made to FIGS. 3A to 3E which already show the layout of a corresponding packaging blank 10 (FIG. 3A) as well as its application on an article grouping 20 (FIG. 3C) that is formed from four identical cans 22. The cans 22 which form the articles 12 to be combined as a packaging unit 18 (see FIG. 2D) can preferably be the same as those shown by way of example in plan view in FIG. 2B. The packaging blanks 10 shown in FIGS. 3A to 3C can also optionally be larger and have more than four through-openings 14, as evident from the schematic plan view of FIG. 2E were grouped rectangular shape.

Thus, FIG. 3A shows a packaging blank 10 which has not yet been pre-treated and which can for example have been cut out of a cardboard sheet by a punching process. In contrast, the plan view of FIG. 3B illustrates such a packaging blank 10 according to FIG. 3A, which has been subjected to a pre-treatment and is therefore designated by the reference sign 10*v*. FIG. 3C shows a packaging unit 18 that is formed by four articles 12 in the form of cans 22 which are combined by a pre-treated packaging blank 10*v* applied to the articles 12 or cans 22.

The sectional views of FIGS. 3D and 3E also each show a sub-region of the packaging blank 10 or 10*v*, in particular a sub-region which shows the through-opening 14 according to FIGS. 3A and 3B in a cross-sectional view.

As can be seen from FIGS. 3A and 3B, the packaging blank 10 has four through-openings 14 with an average or mean diameter d14. In the edge regions 16 bordering the through-openings 14, fixing tabs 32, so designated here, are formed. The fixing tabs 32 are formed in particular by providing radial incisions 34 starting from the through-openings 14. The radial incisions 34 each extend from the inner edge region 16 of each through-opening 14 in an outward direction, i.e. in a direction towards a larger diameter than the actual dimension d14 of the through-openings 14. The radial incisions 34 can be distributed in larger numbers regularly over the round through-openings 14 as is schematically indicated by FIG. 3A.

When the packaging blank 10 is pressed onto suitable expansion tools 46, as described below in connection with FIGS. 6 and 7, or by other suitable forming devices, these fixing tabs 32 are at least partially pressed and/or bent in the same direction as is also specified by the subsequent application process. Since the fixing tabs 32 deflect upwards during an application process of the packaging blank 10 according to FIG. 2C, they are therefore also expediently bent and pre-formed in the same direction by the expansion tools. The fixing tabs 32 preformed and pre-expanded in this way now project upwards beyond the plane of the packaging blank 10 or 10*v* in which the through-openings 14 are located, which is illustrated schematically in the sectional view of FIG. 3E.

By pressing upwards and/or bending the fixing tabs 32 upwards, the mean diameter of a through-opening 14 pre-treated in this way increases, which is indicated by the use of the reference sign d14*v*. In particular, the mean diameter d14 of a through-opening 14 of a packaging blank 10 before pre-treatment is smaller than the mean diameter d14*v* of a through-opening 14*v* of a packaging blank 10*v* after the pre-treatment. Thus, in the present context, a through-opening 14 pre-treated or widened in this way is designated by the reference sign 14*v* (see FIG. 3E).

However, the enlarged average diameter d14*v* of a through-opening 14*v* pre-treated in this way is preferably still at least slightly smaller after the pre-treatment than a maximum average diameter of the articles 12 in their upper region, in particular in an upper region which is located in the finished packaging unit 18 above the packaging blank 10*v* fixed to the articles 12.

Preferably, in the finished packaging unit 18, the fixing tabs 32 are brought into engagement with the underside of the respective lid rim 24 of the cans 22 in such a way that the packaging blank 10 is firmly fixed to the cans 22 and cannot slip off upwards (see also FIG. 2D).

Alternatively, the packaging blank 10 can also be provided with perforations that extend radially away from the through-openings 14. When the packaging blank 10 is pressed onto the expansion tools, these perforations can break open, whereby corresponding fixing tabs 32 are formed which are bent upwards when the packaging blank 10 is further pressed onto the expansion tools, as is illustrated in FIG. 3E.

Furthermore, a packaging blank 10 without such fixing tabs 32 or a packaging blank 10 without corresponding perforations for forming fixing tabs 32 can also be widened by pressing onto correspondingly configured expansion tools in the region of the through-openings 14 and can be accordingly provided with an at least slightly increased average diameter d14*v*. In particular, the material from which the packaging blank 10 consists is pressed together and/or compressed in the immediate edge regions 16 bordering the through-openings 14.

Figure 4B:
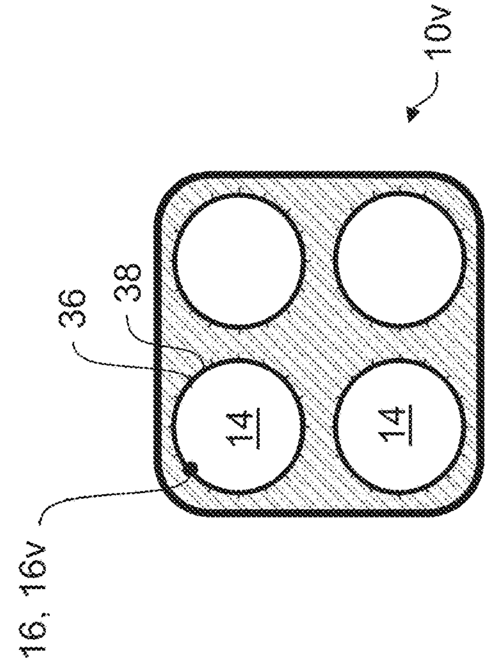
FIGS. 4A to 4C show schematic views of further process steps in a second variant of the pre-treatment of packaging blanks which are subsequently applied to article groupings.
Figure 4A:
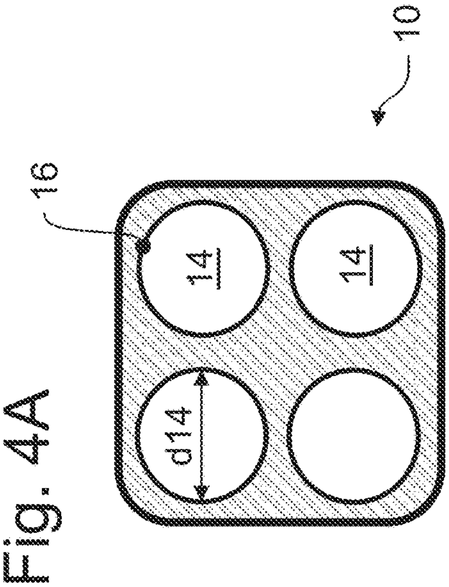
Figure 4C:
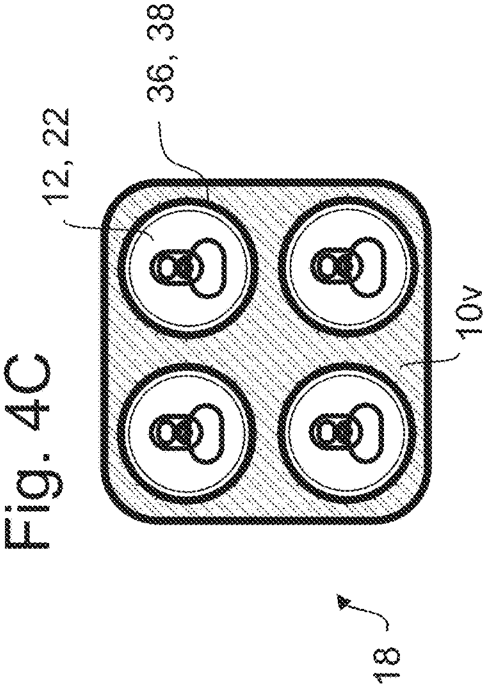

The further schematic plan views of FIGS. 4A to 4C show a further embodiment variant of a packaging blank 10 differing slightly from that in FIGS. 3A to 3E and the corresponding pre-treatment and application of such a packaging blank 10 to an article grouping 20. The packaging blank 10 is similar in its layout to the packaging blanks 10 shown in FIGS. 2A and 3A with their four through-openings 14 for interaction with the lid edges 24 of correspondingly dimensioned cans 22.

Thus, FIG. 4A shows an untreated packaging blank 10, while FIG. 4B shows a pre-treated packaging blank 10*v*. In this regard, it is provided that during the pre-treatment, narrow incisions 36 and/or (micro)perforations are introduced in the edge regions 16 of the through-openings 14 in order to reduce the resistance in these regions. These correspondingly pre-treated edge regions 16 are therefore additionally identified with the reference sign 16*v* in FIG. 4B.

In particular, the narrow incisions 36 introduced in this way extend radially from the through-openings 14. When the pre-treated packaging blank 10 is pressed directly onto the articles 12 or cans 22, the sub-regions 38 formed between the incisions 36 can be pressed upwards with little exertion of force. In particular, this embodiment also provides that the sub-regions 38 engage below an article diameter which is at its regional maximum, whereby the packaging blank 10*v* is firmly fixed to the articles 12 or cans 22. A packaging unit 18 completed in this way with four cans 22, which are held together by such a packaging blank 10*v*, is illustrated in the schematic plan view of FIG. 4C.

Furthermore, it can be provided that the pre-treatment takes place in at least two steps, wherein in a first pre-treatment step, the incisions 36 and/or (micro)perforations are introduced into the packaging blank 10, and in a second method step, the packaging blank 10*v* pre-treated in this way is pressed onto a expansion tool accordingly provided for this purpose, as described further below in connection with FIGS. 6 and 7.

The schematic plan views of FIGS. 5A to 5D also show a third embodiment variant of a packaging blank 10 and the corresponding pre-treatment and application of such a pre-treated packaging blank 10*v* to an article grouping 20.

Figure 5A:
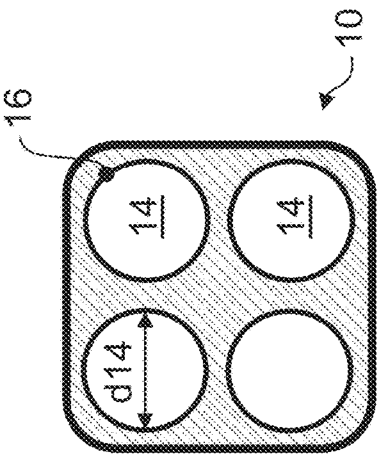
FIGS. 5A to 5D show schematic views of further process steps in a third variant of the pre-treatment of packaging blanks which are subsequently applied to article groupings.
Figure 5B:
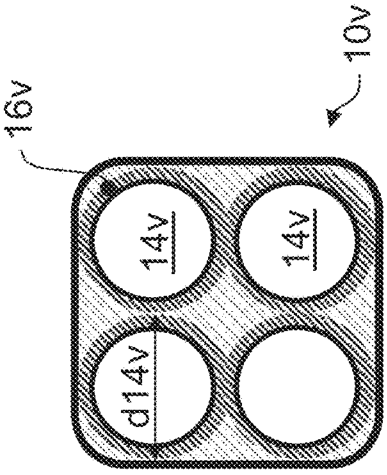

In particular, FIG. 5A shows an untreated packaging blank 10 which fundamentally does not differ from the packaging blank 10 according to FIG. 4A since in the latter as well as the former, the edge region 16 of each through-opening 14 describes a continuous circular contour and can typically be produced by a punching process. The schematic plan view of FIG. 5B shows a pre-treated packaging blank 10*v*. In connection with this pre-treatment step, it is provided that the packaging blank 10 is made more unstable and more flexible in the edge regions 16 of each of its through-openings 14 by moistening. This type of pre-treatment is suitable in particular for packaging blanks 10 made of cardboard material that do not have a water-impermeable coating.

By moistening in which, for example, water vapor or another suitable fluid is applied to the corresponding regions of the packaging blank 10 via a vaporizing device, the material of which the packaging blank 10 consists can be softened at least regionally and thus made more flexible. In particular, the edge regions 16 which border the through-openings 14 for the articles 12 or cans 22 are thereby moistened in a targeted manner.

The fact that the pre-treated through-openings 14*v* can be at least slightly enlarged by such a pre-treatment step is illustrated by the changed diameter d14*v* of the thus pre-treated through-openings 14*v*, as shown in FIG. 5B. The changed diameter d14*v* of the through-openings 14*v* pre-treated by local moistening can be at least slightly enlarged compared to the respective diameters d14 of the original through-openings 14 in the original state of the packaging blank 10 (see FIG. 5A and FIG. 5B).

Figure 5C:
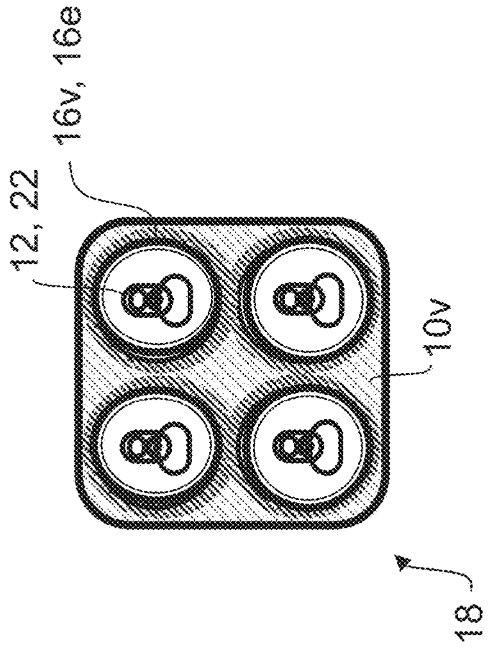
Figure 5D:
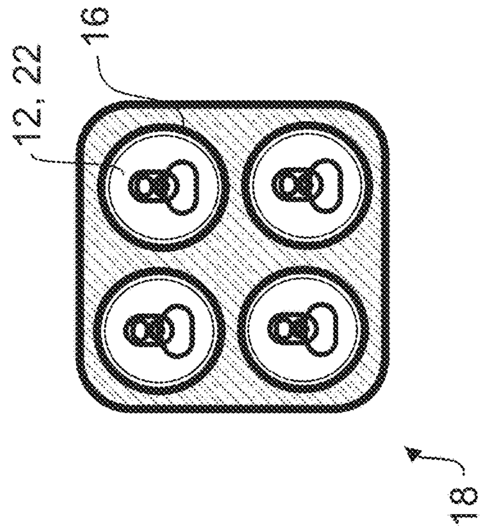

The packaging blank 10*v* with the edge regions 16*v* softened in this way (see FIG. 5B) can now be applied to the articles 12 or cans 22 with a reduced amount of force (FIG. 5C).

Furthermore, a drying step can subsequently be provided in which the moistened edge regions 16*v* of the pre-treated packaging blank 10*v* applied to the articles 12 or cans 22 are dried by a suitable drying device, for example by drying air or the like. During drying, the edge regions 16 regain their original stability in accordance with the material properties of the packaging blank 10 so that the packaging blank 10 can be thereby fixed more firmly to the articles 12 or cans 22 and fits there more tightly (see FIG. 5D).

If the packaging blank 10 consists, for example, of a thermoelastic or thermoplastic material, then by regional heating, in particular by heating the edge regions 16 bordering the through-openings 14, the elastic properties in these heated regions can be increased. After the packaging blank 10*v* with appropriately pre-treated, in particular heated, edge regions 16*e* of the through-openings 14 (see FIG. 5C) has been applied to an article grouping 18, the edge regions 16 of the through-openings 14 are particularly advantageously applied to the outer shell surfaces of the articles 12 or cans 22 during cooling.

Figure 6:
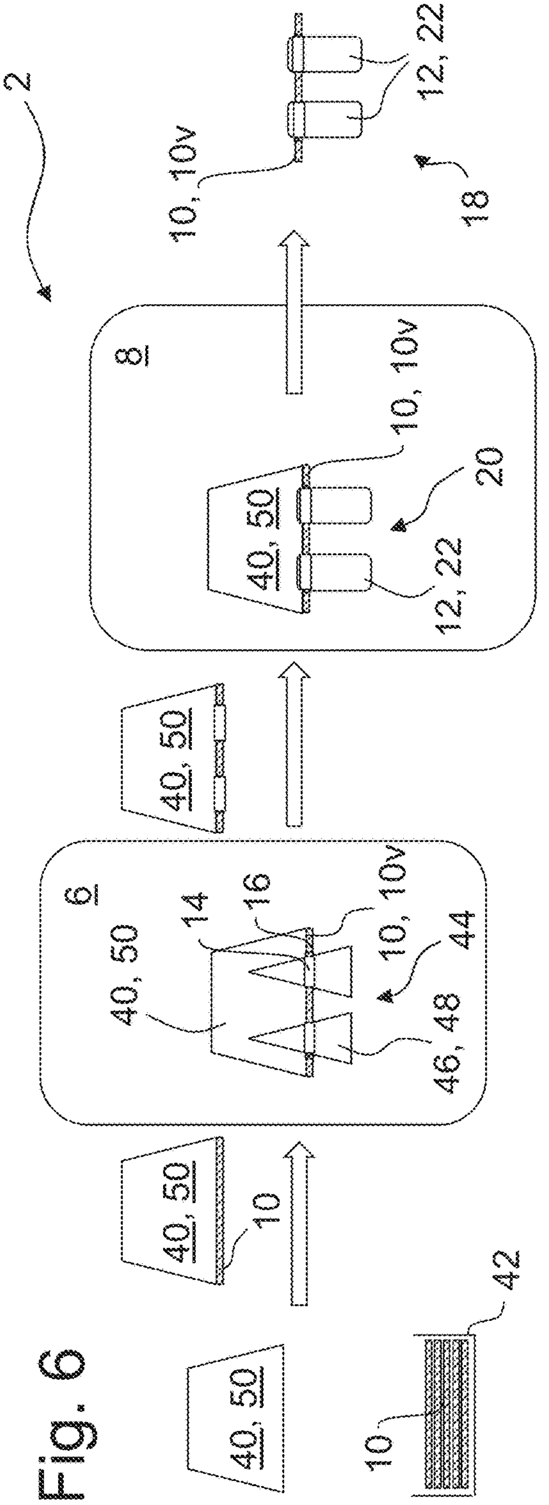
FIG. 6 shows a schematic side view of a first variant of a packaging apparatus which is used for the pre-treatment of packaging blanks and their use for the formation of packaging units.

The schematic side view of FIG. 6 shows a first embodiment of a part of a packaging apparatus 2 with a pre-treatment module 6 as already described above with reference to FIG. 1. A packaging blank 10 is removed from a magazine 42 by a gripper head 40 suitable therefor, for example a vacuum suction cup 14, and transferred to the pre-treatment module 6. This pre-treatment module 6 comprises the expansion dies 44 mentioned multiple times above, which are required for the pre-treatment of the packaging blanks 10.

Each of these expansion dies 44, so designated here, is equipped with a number of expansion tools 46 which corresponds to the number of through-openings 14 in each packaging blank 10 to be pre-treated. The arrangement of the expansion tools 46 within the expansion die 44 must also correspond to the arrangement of the through-openings 14 in the packaging blank 10. Thus, the expansion tools 46 are in a relative arrangement that corresponds to the arrangement of the articles 12 or cans 22 in the finished packaging unit 18.

In the present case, the expansion tools 46 of the expansion die can, for example, each be formed by expansion cones 48, so designated here. The at least one gripper head 40, which removes the packaging blanks 10 from the magazine 42 and transfers them to the pre-treatment module 6, can be formed for example by a vacuum unit 50 or the like.

Each individual packaging blank 10 that is located on the vacuum unit 50 of the gripper head 40 is pressed onto the expansion cones 48 or is slipped over the expansion cones 48 by the gripper head 40 so that in each instance, an expansion cone 48 protrudes through a through-opening 14 of the packaging blank 10.

The packaging blank 10 is pressed downwards on the expansion cones 48 at least far enough that the edge regions 16 of the through-openings 14 are expanded by the downwardly widening cross-section of the expansion cones 48, whereby the diameter of the through-openings 14 is increased at least slightly. The packaging blank 10*v* pre-treated in this way is then conveyed to the downstream packaging module 8 by the gripper head 40 still holding the packaging blank 10*v* and applied to a waiting article grouping 20.

Due to the slope or conical shape of the expansion cones 48 with their upwardly directed tips, the packaging blank 10 is centered and precisely positioned or aligned. Optionally, it can be provided here that the packaging blank 10 is released at least briefly from the gripper head 40 for the centering. The pre-treated packaging blank 10*v* can then be picked up precisely by the gripper head 40 and placed on a corresponding combination of articles 12 or cans 22, i.e. on an article grouping 20, and secured to them by pressing down.

Figure 7:
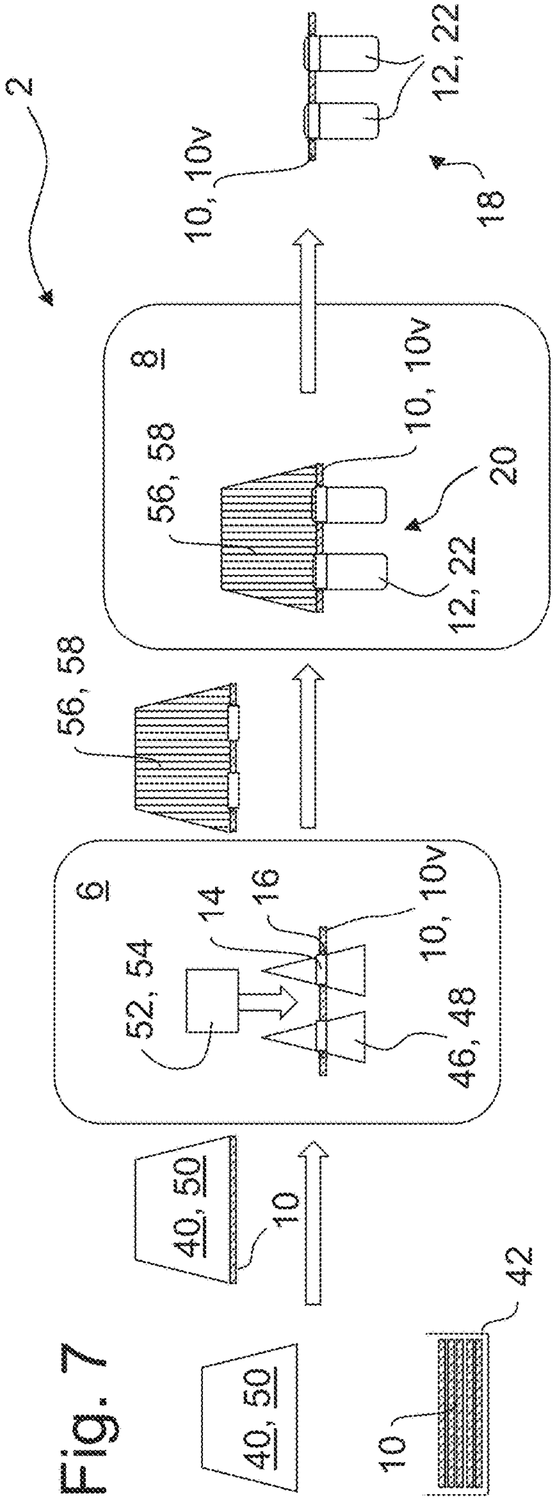
FIG. 7 shows a schematic side view of a second variant of the packaging apparatus which serves for the pre-treatment of packaging blanks and their use for the formation of packaging units.

The schematic side view of FIG. 7 shows a second embodiment of a part of a packaging apparatus 2 with a pre-treatment module 6, as already described above with reference to FIG. 1. In this second embodiment, the packaging blank 10 is completely released within the pre-treatment module 6 by the gripper head 40 and is pressed onto the expansion cones 48 with the aid of a suitable tool 52, formed for example by a press punch 54, in order to widen the edge regions 16 of the through-openings 14 and in this way to reduce the resistance force of the packaging blank 10 in the edge regions 16 during subsequent application to the articles 12 or cans 22.

The remaining components of the second embodiment variant of the packaging apparatus 2 shown in FIG. 7 substantially correspond to the components of the first embodiment variant of the packaging apparatus 2 shown in FIG. 6 already described above, even if no corresponding information is given in this regard.

Following the application of the packaging blank 10*v* to the expansion cones 48 of the expansion tool 46, the packaging blank 10*v* pre-treated in this way is picked up by a further gripper head 56, which can also be configured as a vacuum suction device 58, for example, and further conveyed from the pre-treatment module 6 to the downstream packaging module 8.

It should be noted at this point that, selectively, a plurality of expansion cones 48 arranged regularly or in an expansion die 44 can be inserted as combined modules not only together into the packaging machine 2, or into its pre-treatment module 6, and removed from there as required, which can be useful for example when changing products and processing packaging blanks 10 with changed dimensions or spacings of the through-openings 14 and/or changed diameters of the through-openings 14 or also processing packaging blanks 10 with a different number of through-openings 14 per packaging blank 10, etc.

The option of a mechanical exchange of a plurality of expansion cones 48 or an expansion die 44 with a plurality of regularly arranged expansion cones 48 will be examined in more detail with reference to the following FIGS. 8A to 11 and described in detail below. As will be explained further below with reference to the embodiment variants of FIGS. 8A to 11, a plurality of expansion cones 48 arranged regularly and within an expansion die 44 of the expansion tool 46 considered here can be regarded as combined modules and can be changed in their respective entirety by changing their dimensions and/or their relative positions to one another, by exchanging the active expansion die, which can be a particularly useful option and can be considered an essential part of the present invention when changing products and processing packaging blanks 10 with changed dimensions or spacings of the through-openings 14 and/or changed diameters of the through-openings 14, or also when processing packaging blanks 10 with a different number of through-openings 14 per packaging blank 10.

The schematic representations of FIGS. 8A to 9B and 10 to 11 show different embodiment variants of a packaging apparatus 2 according to the invention, which are equipped with different configurations of handling robots, in particular in the region of their corresponding pre-treatment module 6, in order to use, as required, the different available expansion dies 44 which can be necessary for the pre-treatment of different packaging blanks 10.

Figure 8A:
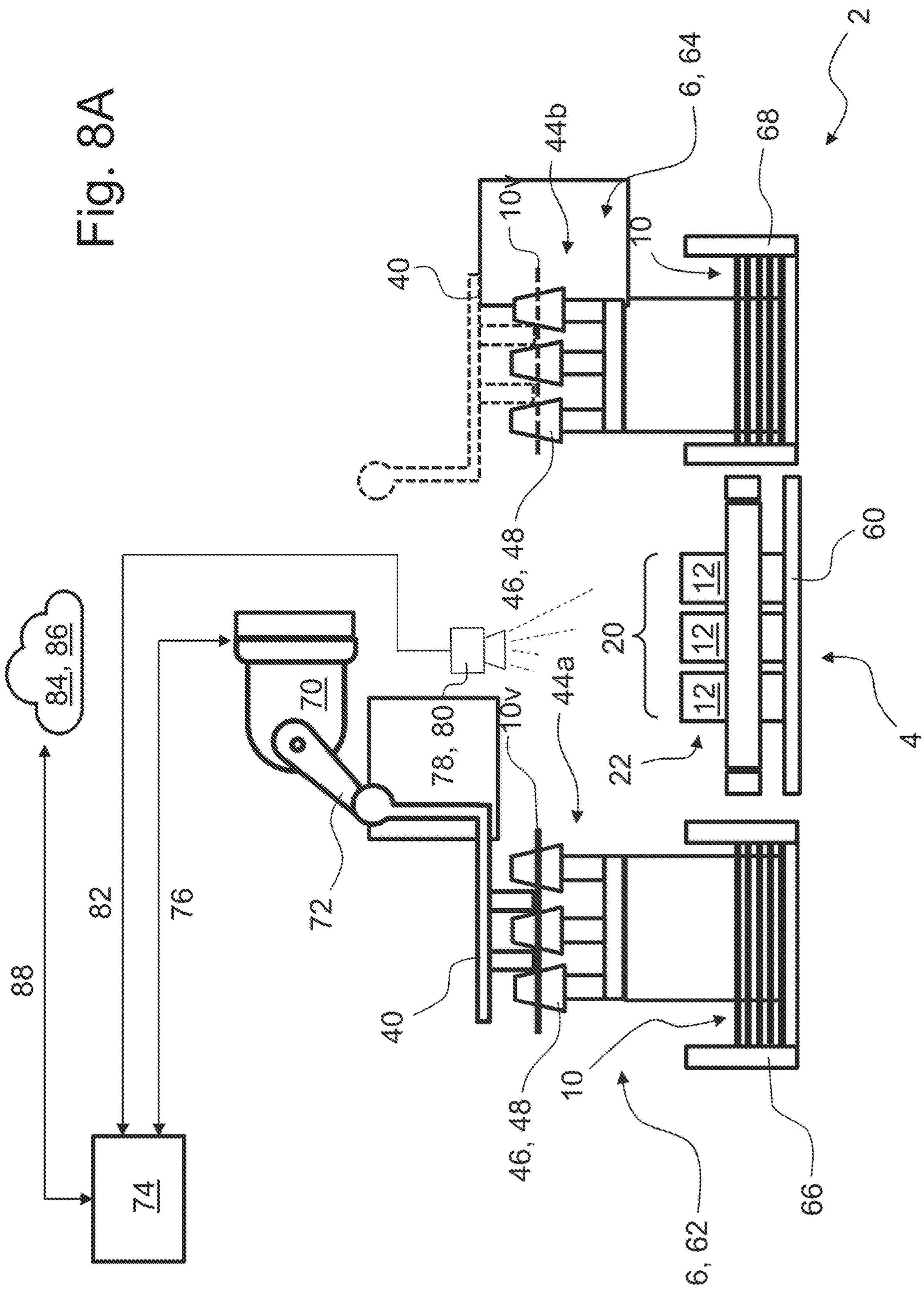
FIG. 8A shows a first embodiment variant of the packaging apparatus which is equipped with a feed device for conveying article groupings in a defined conveying direction on a horizontal conveyor device provided for this purpose, and in which a first configuration of handling robots is provided.

Thus, the schematic representation of FIG. 8A shows a first embodiment variant of the packaging apparatus 2 which is equipped with a feed device 4 for conveying article groupings 20 in a defined conveying direction on a horizontal conveyor device 60 or similar conveying device provided for this purpose. The article groupings 20 conveyed on the horizontal conveyor device 60 of the feed device 4 each comprise a defined number of articles 12 or cans 22, wherein this number and the arrangement of the articles 12 or cans 22 relative to one another in the respective grouping 20 can differ so that differently configured packaging blanks 10 may be required for this purpose in order to combine the groupings 20 into packaging units 18.

Since the transport direction or conveying direction of the horizontal conveyor device 60 points vertically into the plane of the drawing or out of it, it is not separately indicated in FIGS. 8A to 9B.

The pre-treatment module 6 of the packaging apparatus 2 according to FIG. 8A comprises at least one first pre-breaking station 62 which is arranged on the left side of the feed device 4, as well as at least one second pre-breaking station 64 which is located on the right side of the feed device 4. In the immediate vicinity of the first pre-breaking station 62, there is a first magazine 66 for a first variant of packaging blanks 10 which have not yet been pre-treated and whose through-openings can be punched there in a first arrangement.

In the immediate vicinity of the second pre-breaking station 64, there is a second magazine 68 for a second variant of packaging blanks 10 which have not yet been pre-treated and whose through-openings can each be punched there in a second arrangement, wherein the spacings and/or size of the through-openings of the packaging blanks 10 of the first magazine 66 can differ from the spacings and/or the sizes of the through-openings of the packaging blanks 10 of the second magazine 68 so that the packaging blanks 10 of the first magazine 66 which have not yet been treated are not suitable for being pre-treated with an expansion die 44 which is matched to the spacings and/or sizes of the packaging blanks 10 of the second magazine 68.

In order to remove the respective packaging blanks 10 from one of the two magazines 66 or 68 and to feed them to the pre-breaking station 62 or 64 located in the vicinity thereof, in the first embodiment variant of the packaging apparatus 2 shown in FIG. 8A, a first handling robot 70 can be provided whose preferably multi-axis movable pivot arm 72 is equipped with a gripper head 40 which is able to remove the packaging blanks 10 from one of the two magazines 66 or 68 and to feed them to each required pre-breaking station 62 or 64. After pre-treatment at one of the pre-breaking stations 62 or 64, the same first handling robot 70 places the pre-treated packaging blanks 10*v* onto the article grouping 20 provided on the horizontal conveyor 60 of the feed device 4 in order to form the packaging units 18 in this way, as has already been described in detail above.

In the illustration in FIG. 8A, the gripper head 40 guided on the pivot arm 72 of the handling robot 70 with the packaging blank 10 or 10*v* received there is located at the first pre-breaking station 62 shown on the left and presses the packaging blank 10 onto the upwardly conically tapering expansion tools 46 of the first expansion die 44*a* of the first pre-breaking station 62. As a result, the through-openings of the packaging blank 10 are expanded in the desired manner by the expansion tools 46, formed by expansion cones 48, of the first expansion die 44*a* so that the packaging blank 10*v* pre-treated in this way can be placed on the article grouping 20.

The second expansion die 44*b* located at the second pre-breaking station 64 is not required in this process phase, nor is the entire second pre-breaking station 64 as well as its second magazine 68 with the packaging blanks 10 located there so that the gripper head 40 of the handling robot 70 is shown in broken lines. This serves to clarify that the first handling robot 70 is preferably constructed and configured such that it can reach both pre-breaking stations 62 and 64 of the pre-treatment module 6 in the same way and selects the pre-breaking station 62 or 64 whose expansion die 44*a* or 44*b* is currently required for the article groupings 20 to be equipped with pre-treated packaging blanks 10*v*.

Even if this is not clearly evident from the schematic representation in FIG. 8A, the first and second expansion dies 44*a* and 44*b* differ in at least one of their parameters, i.e. either in the diameters or dimensions of their expansion cones 48 or expansion tools 46, in their spacings and/or arrangements on the expansion die 44*a* or 44*b*, or with regard to both parameters. Since the articles 12 or cans 22 can differ both in their dimensions as well as in regard to their respective number in the formed article groupings 20, the packaging blanks 10 required for this purpose can differ both in terms of the number of their through-openings, in terms of the respective diameter of the through-openings, and in terms of their relative arrangement to one another, which can be taken into account by the different pre-breaking stations 62 and 64 with their different expansion dies 44*a* and 44*b*.

Under certain circumstances, it may be useful to make the gripper head 40 interchangeable and to have a tool change magazine available for this purpose, which can be located within the range of the pivot arm 72 of the handling robot 70. However, such a tool change magazine is not shown in FIGS. 8A to 9C. Such a tool change magazine, or a plurality of such tool change magazines, is/are shown in FIGS. 9D to 11.

The schematic representation of FIG. 8A further shows a control center 74 which controls at least the handling robot 70 as well as its movements during the removal of the packaging blanks 10 from one of the two magazines 66 or 68 as well as during the feeding of the packaging blanks 10 to the utilized pre-breaking station 62 or 64, and also during the pressing of the pre-treated packaging blanks 10*v* onto the top of the articles 12 or cans 22 of the available article groupings 20. The control center 74 supplies corresponding control signals 76 to the handling robot 70. The fact that the data connection between the control center 74 and the handling robot 70 is a double arrow provided with reference sign 76 is intended to express that the handling robot 70 can preferably also supply sensor signals of different types to the control center 74 in order to facilitate the precise movement control by the control center of the pivot arm 72 and the gripper head 40.

In addition, FIG. 8A shows an optional optical sensor device 78 which can be formed in particular by a camera 80 with downstream image analysis. This optional optical sensor device 78 or camera 80 with its downstream image analysis can be assigned to the horizontal conveyor device 60. Its task can in particular be to monitor the finished packaging units 18 with the pre-treated packaging blanks 10*v*, wherein the image analysis can in particular be aimed at checking whether all tabs on the through-openings of the packaging blanks 10 are correctly engaged and/or whether the packaging blank is locked in the intended manner with the articles 12 or cans 22 and is located in the intended horizontal plane.

The optional optical sensor device 78 or camera 80 also expediently supplies its image signals 82 to the control center 74 in which the appropriate image analysis can be located in order to obtain the desired or required information on the condition of the finished packaging units from the image signals 82.

In addition, the control center 74 can optionally be connected to an external data storage device 84 which can be formed for example by a data cloud 86. The data 88 exchanged between the external data storage device 84 or the data cloud 86 with the control center 74 are also indicated by a double arrow, which is intended to characterize the bidirectionality of the data exchange.

In addition, the control center 74 can expediently be coupled to the feed device 4 as well as to the pre-treatment module 6 which however is not clearly illustrated in the representation in FIG. 8A.

Figure 8B:
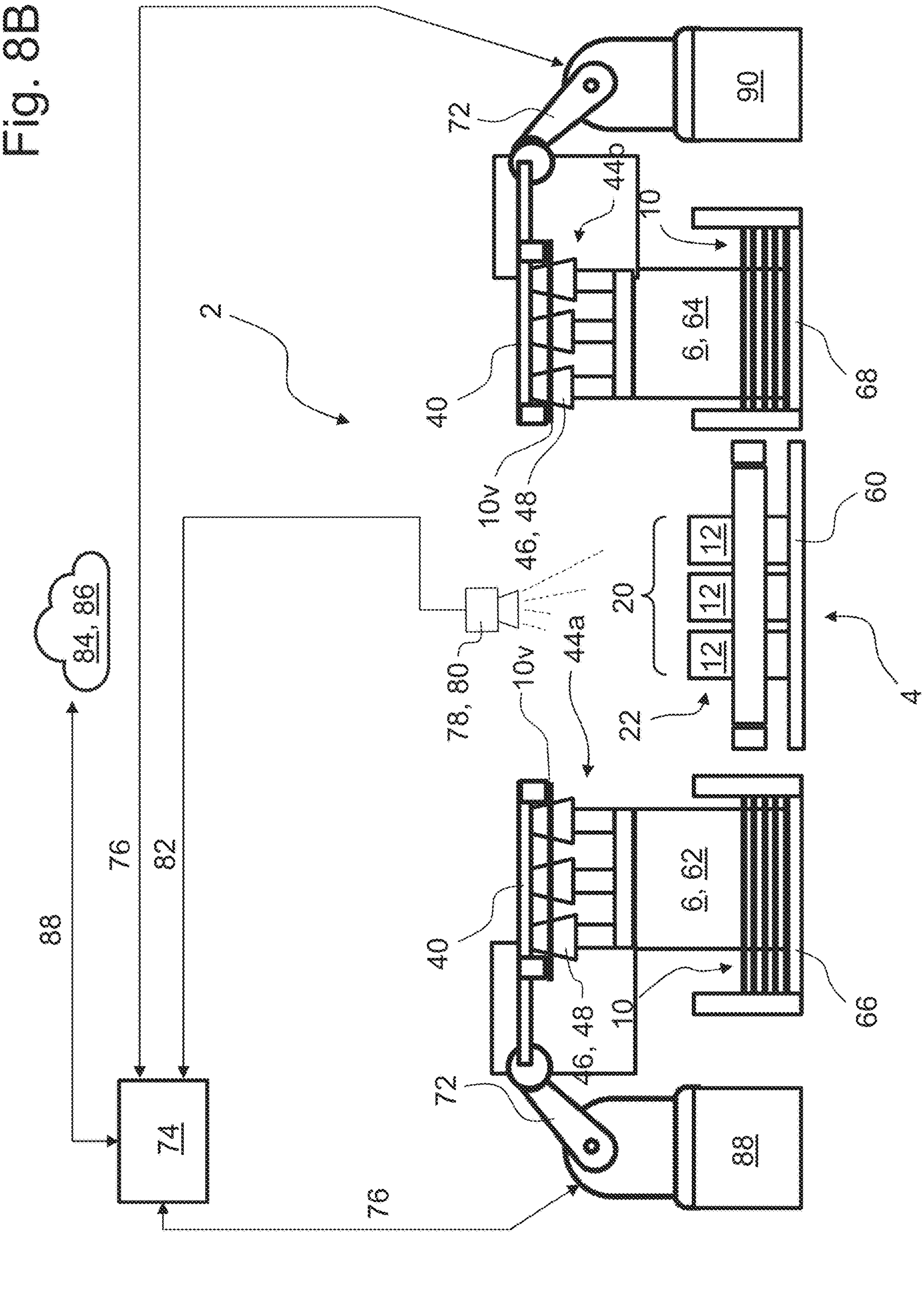
FIG. 8B shows a second embodiment variant of the packaging apparatus with a second configuration of handling robots.

Furthermore, the schematic representation in FIG. 8B shows a second embodiment variant of the packaging apparatus 2 which in turn is equipped with a feed device 4 for conveying article groupings 20 in a defined conveying direction on a horizontal conveyor device 60 or similar conveying device provided for this purpose. The article groupings 20 are conveyed on the horizontal conveyor device 60 of the feed device 4, wherein the number and arrangement of the articles 12 or cans 22 relative to one another in the respective grouping 20 can differ, as has already been described multiple times above, so that differently configured packaging blanks 10 can be required for this purpose in order to combine the groupings 20 into packaging units 18.

The pre-treatment module 6 of the packaging apparatus 2 according to FIG. 8B comprises, in the same way as already explained with reference to FIG. 8A, the first pre-breaking station 62 which is arranged on the left side of the feed device 4, as well as the second pre-breaking station 64 which is located on the right side of the feed device 4. The two pre-breaking stations 62 and 64 are in turn each equipped with first and second magazines 66 and 68 in which different variants of packaging blanks 10 are located.

In order to remove the respective packaging blanks 10 from one of the two magazines 66 or 68 and to feed them to the pre-breaking station 62 or 64 located in their vicinity, in the second embodiment variant of the packaging apparatus 2 shown in FIG. 8B, each of the two pre-breaking stations 62 and 64 has its own handling robot 88 and 90. In the shown exemplary embodiment, a second handling robot 88 is assigned to the first pre-breaking station 62 and its first magazine 66, while a third handling robot 90 is assigned to the second pre-breaking station 64 and its second magazine 68.

Each of the two handling robots 88 and 90, i.e. the second and the third handling robot 88 and 90, has a pivot arm 72 preferably movable with multiple axes, which arm is equipped with a gripper head 40. Using the respective gripper heads 40, the packaging blanks 10 can be removed from the magazines 66 and 68 and fed to the required pre-breaking station 62 or 64.

After pre-treatment at one of the pre-breaking stations 62 or 64, the pre-treated packaging blanks 10*v* are preferably placed by the active handling robot 88 or 90, i.e. by the second handling robot 88 or the third handling robot 90, onto the article grouping 20 provided on the horizontal conveyor device 60 of the feed device 4 in order to form the packaging units 18 in this way, as has already been described in detail above. Since the range of the pivot arms 72 of the handling robots 88 and 90 shown in FIG. 8B may not be sufficient for this purpose, it may be useful to make the positions of the two handling robots 88 and 90 variable so that they can be configured, for example, as mobile handling robots 88 and 90.

In the representation in FIG. 8B, the gripper head 40 guided on the pivot arm 72 of the second handling robot 88 with the packaging blank 10 or 10*v* received there is located at the first pre-breaking station 62 shown on the left and presses the packaging blank 10 onto the upwardly conically tapering expansion tools 46 of the first expansion die 44*a* of the first pre-breaking station 62. As a result, the through-openings of the packaging blank 10 are expanded in the desired manner by the expansion tools 46, formed by expansion cones 48, of the first expansion die 44*a*, so that the packaging blank 10*v* pre-treated in this way can be placed on the article grouping 20.

In addition, the gripper head 40 guided on the pivot arm 72 of the third handling robot 90 with the packaging blank 10 or 10*v* picked up there is located at the second pre-breaking station 64 shown on the right and presses the packaging blank 10 onto the upwardly conically tapering expansion tools 46 of the second expansion die 44*b* of the second pre-breaking station 64. As a result, the through-openings of the packaging blank 10 are expanded, also in the desired manner, by the expansion tools 46, formed by expansion cones 48, of the second expansion die 44*a* so that the packaging blank 10*v* pre-treated in this way can selectively be placed on the article grouping 20.

However, only one of the two handling robots 88 or 90 is active at any one time, while the other remains inactive, which depends on the packaging blanks 10 required in each instance, which can be used to equip the article groupings 20 conveyed and held ready on the feed device 4.

As already explained above on the basis of FIG. 8A, the first and second expansion dies 44*a* and 44*b* differ in at least one of their parameters, i.e. either in the diameters or dimensions of their expansion cones 48 or expansion tools 46, in their spacings and/or arrangements on the expansion die 44*a* or 44*b*, or with regard to both parameters.

FIG. 8B also again shows the control center 74 which preferably controls the second handling robot 88 and the third handling robot 90 as well as their movements during the removal of the packaging blanks 10 from the magazines 66 or 68 assigned to them, as well as during the feeding of the packaging blanks 10 to the utilized pre-breaking station 62 or 64, and also during the pressing of the pre-treated packaging blanks 10*v* onto the top side of the articles 12 or cans 22 of the available article groupings 20. The control center 74 supplies corresponding control signals 76 to the second handling robot 88 as well as to the third handling robot 90. The fact that the data connections between the control center 74 and the handling robots 88 and 90 are shown by double arrows, each provided with the reference sign 76, is intended to express that each of the second and third handling robots 88 and 90 can preferably also supply sensor signals of different types to the control center 74 in order to facilitate the precise movement control by the control center of the respective pivot arms 72 and the gripper heads 40.

The optional optical sensor device 78 shown in FIG. 8B, which can be formed in particular by a camera 80 with downstream image analysis, preferably corresponds to the optical sensor device 78 already described above with reference to FIG. 8A so that a further explanation is not necessary at this point, and reference can be made to the above explanations. The optional optical sensor device 78 or camera 80 also expediently supplies its image signals 82 to the control center 74, in which the appropriate image analysis can be located in order to obtain the desired or required information on the condition of the finished packaging units from the image signals 82.

In addition, the control center 74 can optionally be connected to an external data storage device 84, which can be formed for example by a data cloud 86. The data 88 exchanged between the external data storage device 84 or the data cloud 86 with the control center 74 are also indicated by a double arrow, which is intended to characterize the bidirectionality of the data exchange.

Again, the control center 74 can expediently be coupled to the feed device 4 as well as to the pre-treatment module 6, which however is not clearly illustrated in the representation in FIG. 8B.

Figure 8C:
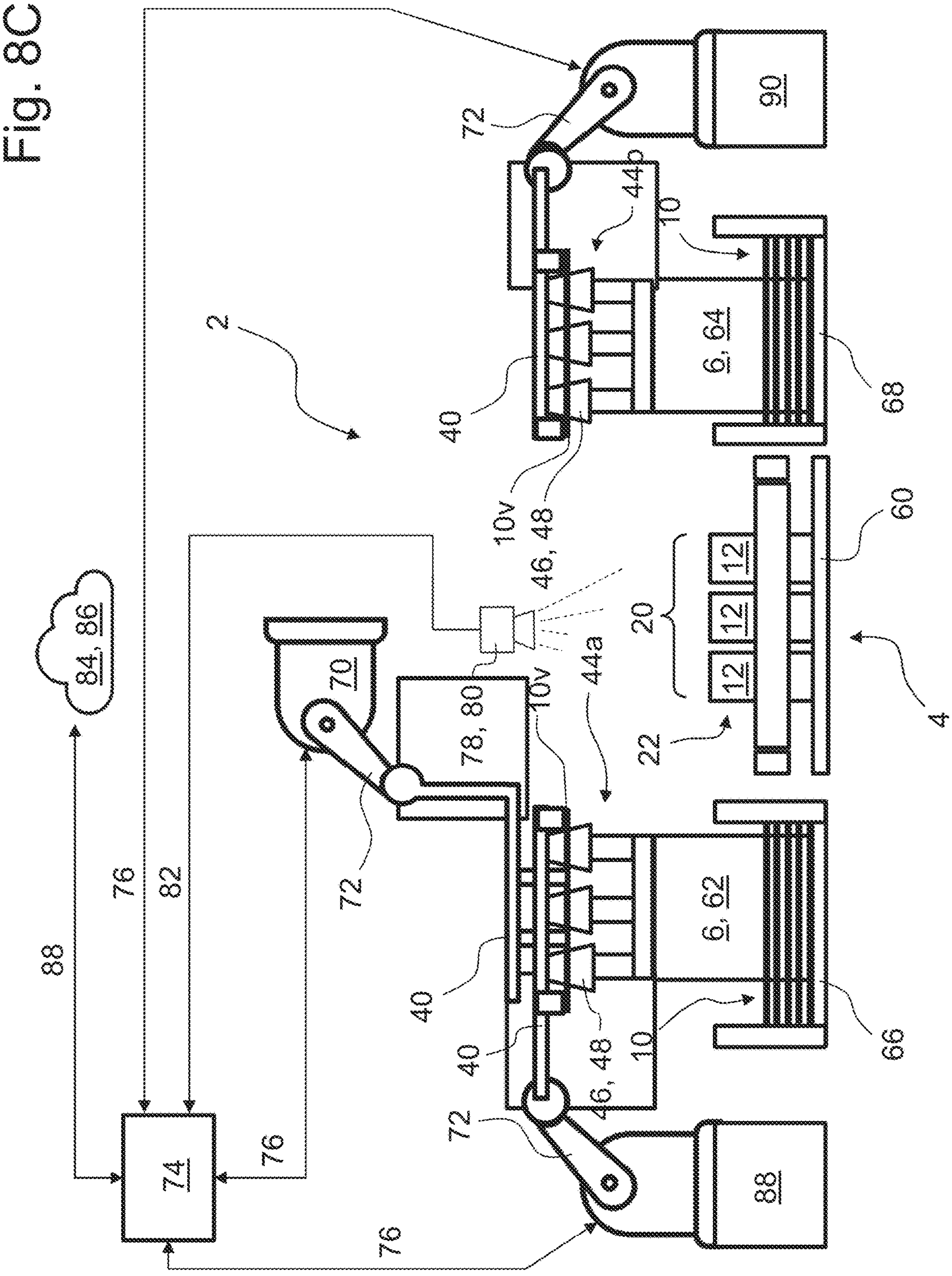
FIG. 8C shows a third embodiment variant of the packaging apparatus with a third configuration of handling robots.

In addition, the schematic representation in FIG. 8C shows a third embodiment variant of the packaging apparatus 2 which in turn is equipped with a feed device 4 for conveying article groupings 20 in a defined conveying direction on a horizontal conveyor device 60 or similar conveying device provided for this purpose, as already shown in FIGS. 8A and 8B.

The pre-treatment module 6 of the packaging apparatus 2 according to FIG. 8C comprises, in the same way as already explained with reference to FIG. 8A and FIG. 8B, the first pre-breaking station 62, which is arranged on the left side of the feed device 4, and the second pre-breaking station 64, which is located on the right side of the feed device 4. The two pre-breaking stations 62 and 64 are in turn each equipped with first and second magazines 66 and 68 in which different variants of packaging blanks 10 are located.

In order to remove the respective packaging blanks 10 from one of the two magazines 66 or 68 and to feed them to the pre-breaking station 62 or 64 located in their vicinity, in the third embodiment variant of the packaging apparatus 2 shown in FIG. 8C, each of the two pre-breaking stations 62 and 64 also has its own handling robot 88 and 90. Thus, the first pre-breaking station 62 and its first magazine 66 are assigned the second handling robot 88, while the second pre-breaking station 64 and its second magazine 68 are assigned the third handling robot 90.

Each of the two handling robots 88 and 90, i.e. the second and the third handling robot 88 and 90, has a pivot arm 72 preferably movable with multiple axes, which arm is equipped with a gripper head 40. Using the respective gripper heads 40, the packaging blanks 10 can be removed from the magazines 66 and 68 and fed to the required pre-breaking station 62 or 64.

However, after pre-treatment has taken place at one of the pre-breaking stations 62 or 64, the pre-treated packaging blanks 10*v* are not handled by one of the two handling robots 88 or 90 located there, but rather are each taken by the first handling robot 70 and placed on the article grouping 20 provided on the horizontal conveyor device 60 of the feed device 4 in order to form the packaging units 18 in this way, as has already been described in detail above. In the third exemplary embodiment, the first handling robot 70, which has a corresponding range of its pivot arm 72, is to be exclusively responsible for this process, while the second and third handling robots 88 and 90 are each to be exclusively responsible for handling the packaging blanks between the respective magazines 66 or 68 and the pre-breaking stations 62 or 64.

In the illustration of FIG. 8C, the gripper head 40 guided on the pivot arm 72 of the second handling robot 88 with the packaging blank 10 or 10*v* received there is located at the first pre-breaking station 62 shown on the left and presses the packaging blank 10 onto the upwardly conically tapering expansion tools 46 of the first expansion die 44*a* of the first pre-breaking station 62. As a result, the through-openings of the packaging blank 10 are expanded in the desired manner by the expansion tools 46, formed by expansion cones 48, of the first expansion die 44*a,* so that the packaging blank 10*v* pre-treated in this way can be placed on the article grouping 20.

In addition, the gripper head 40 guided on the pivot arm 72 of the third handling robot 90 with the packaging blank 10 or 10*v* picked up there is located at the second pre-breaking station 64 shown on the right and presses the packaging blank 10 onto the upwardly conically tapering expansion tools 46 of the second expansion die 44*b* of the second pre-breaking station 64. As a result, the through-openings of the packaging blank 10 are expanded, also in the desired manner, by the expansion tools 46, formed by expansion cones 48, of the second expansion die 44*a,* so that the packaging blank 10*v* pre-treated in this way can selectively be placed on the article grouping 20.

The gripper head 40 of the first handling robot 70 can optionally be equipped with suction devices which can engage in the manner of a comb or rake between the handling devices of the gripper head 40 of the second handling robot 88.

As already explained above, it is again expedient that only one of the two handling robots 88 or 90 is active at any one time, while the other remains inactive, which depends on the required packaging blanks 10, which can be used to equip the article groupings 20 conveyed and held ready on the feed device 4.

As already explained above on the basis of FIG. 8A and on the basis of FIG. 8B, the first and second expansion dies 44*a* and 44*b* differ in at least one of their parameters, i.e. either in the diameters or dimensions of their expansion cones 48 or expansion tools 46, in their spacings and/or arrangements on the expansion die 44*a* or 44*b,* or with regard to both parameters.

FIG. 8C also again shows the control center 74 which preferably controls the first handling robot 70, the second handling robot 88, as well as the third handling robot 90 and their respective movements during the removal of the packaging blanks 10 from the magazines 66 or 68 assigned to them, as well as during the feeding of the packaging blanks 10 to the utilized pre-breaking station 62 or 64, and also during the pressing, by the first handling robot 70, of the pre-treated packaging blanks 10*v* onto the top side of the articles 12 or cans 22 of the available article groupings 20. The control center 74 supplies corresponding control signals 76 to the first handling robot 70, to the second handling robot 88, as well as to the third handling robot 90. The fact that the data connections between the control center 74 and the handling robots 88 and 90 are shown by double arrows, each provided with reference sign 76, is intended to express that each of the first, second and third handling robots 70, 88 and 90 can preferably also supply sensor signals of different types to the control center 74 in order to facilitate the precise movement control by the control center of the pivot arms 72 and the gripper heads 40.

The optional optical sensor device 78 also shown in FIG. 8C, which can be formed in particular by a camera 80 with downstream image analysis, preferably corresponds to the optical sensor device 78 already described above with reference to FIG. 8A and 8B, so that a further explanation is not necessary at this point and reference can be made to the above explanations. The optional optical sensor device 78 or camera 80 also expediently supplies its image signals 82 to the control center 74, in which the appropriate image analysis can be located in order to obtain the desired or required information on the condition of the finished packaging units from the image signals 82.

In addition, the control center 74 can optionally be connected to an external data storage device 84, which can be formed for example by a data cloud 86. The data 88 exchanged between the external data storage device 84 or the data cloud 86 with the control center 74 are also indicated by a double arrow, which is intended to characterize the bidirectionality of the data exchange.

The external data storage device 84, which can be formed for example by a data cloud 86, can be used to feed in and temporarily store numerous data such as the measured and/or specifiable angles during the deformation of the tabs and/or the measured and/or predeterminable force values for the motors used for pressing the packaging blanks onto the article groupings 20, wherein the type of bundle being processed can also be taken into account.

Further relevant data can be stored there and made available to the control center 74, such as information about the manufacturers and/or the materials and/or material thicknesses of the utilized packaging blanks, since this information can be used to obtain and derive useful setting values, threshold and target values for the packaging apparatus 2 as well as for other system components.

In addition, the principles of machine learning can be taken into account for all of these data exchanged between the control center 74 and the data storage device 84, in particular with the additional use of artificial intelligence.

Again, the control center 74 can expediently be coupled to the feed device 4 and to the pre-treatment module 6, which however is not illustrated in FIG. 8C.

Figure 9A:
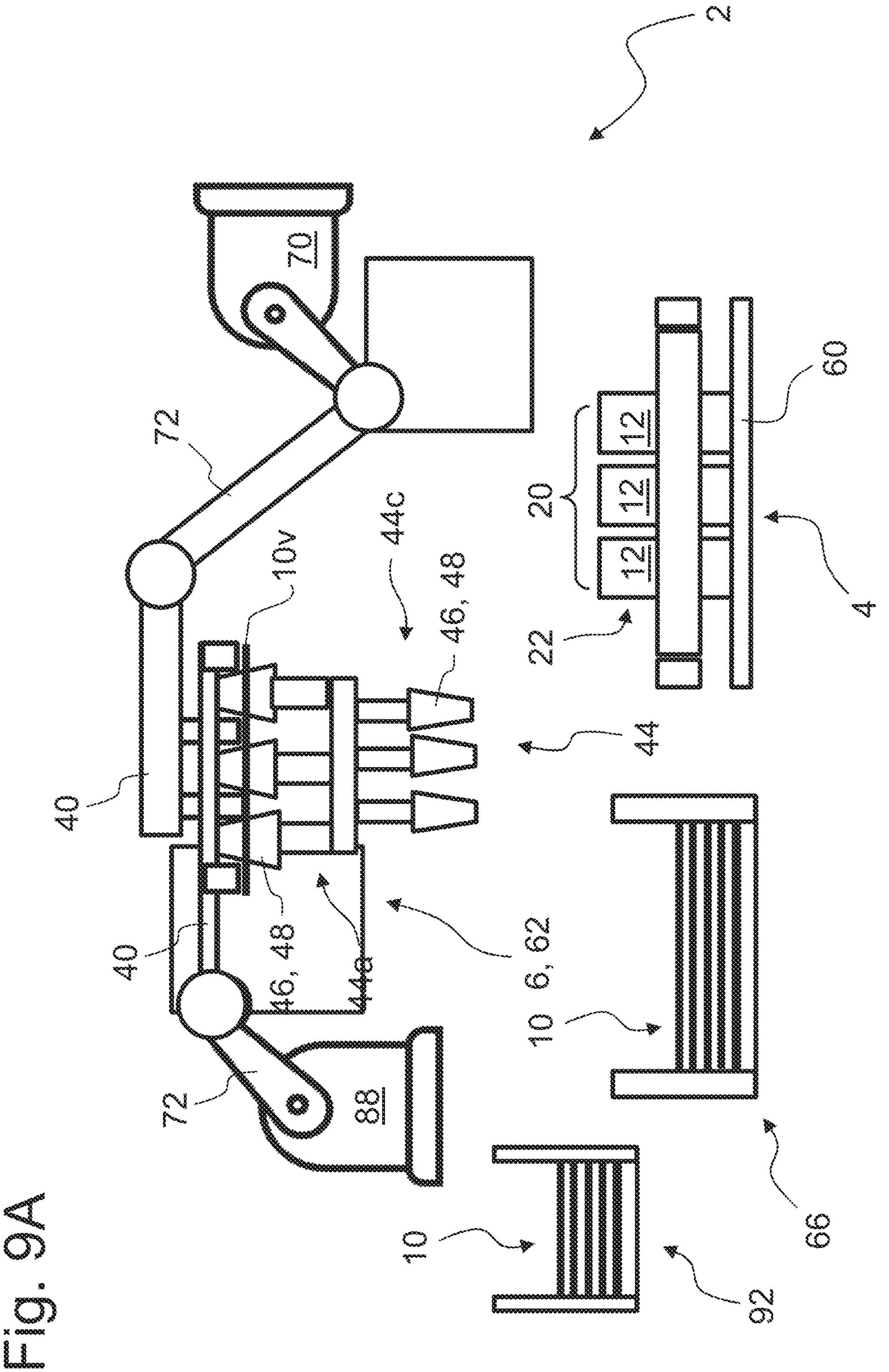
FIGS. 9A and 9B show variants of pre-breaking stations which are parts of a pre-treatment module according to FIGS. 8A to 8C.
Figure 9B:
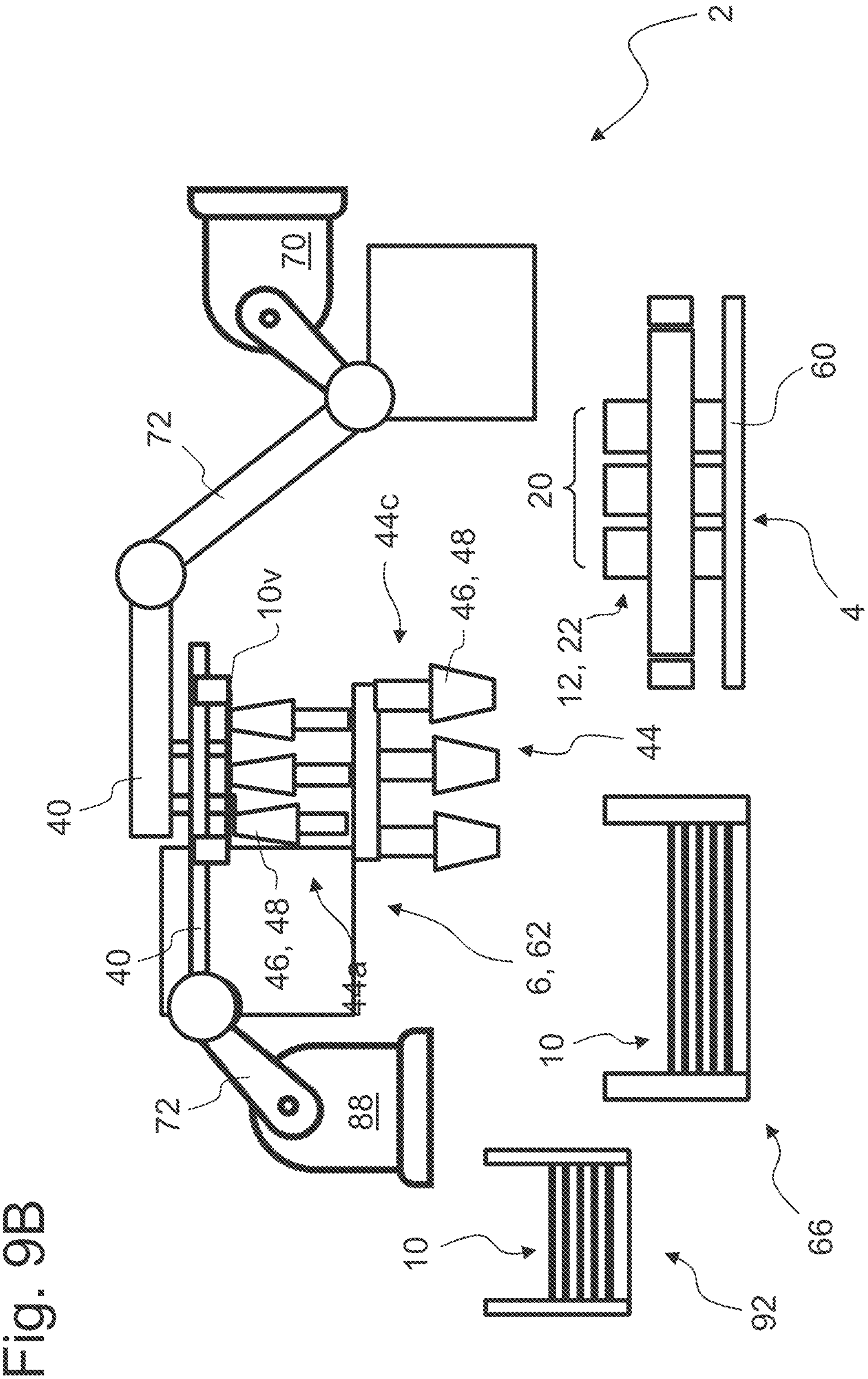

FIGS. 9A and 9B show a variant of one of the pre-breaking stations 62 or 64 of the pre-treatment module 6 according to one or more of FIGS. 8A to 8C, wherein the first pre-breaking station 62 located on the left side of the feed device 4 is shown here, while the second pre-breaking station 64 (see FIGS. 8A to 8C) is not shown here. Accordingly, the third handling robot 90 is also not shown; only the second handling robot 88 together with the first handling robot 70. The first handling robot 70 in turn serves to take the packaging blanks 10*v* pre-treated by the first pre-breaking station 62 from the expansion die 44 and to place them on the article groupings 20 provided on the horizontal conveyor device 60 of the feed device 4, each formed from a defined number of articles 12 or cans 22 in a defined arrangement relative to one another.

In this embodiment variant of the first pre-breaking station 62, the second handling robot 88 has two different magazines 66 and 92 available, namely the first magazine 66 which contains larger packaging blanks 10, as well as a third magazine 92 arranged near the first magazine 66 which holds smaller packaging blanks 10 for removal by the second handling robot 88. The larger packaging blanks 10 located in the first magazine 66 can be removed when appropriately dimensioned or configured article groupings 20 are to be equipped with them, which applies accordingly to the smaller packaging blanks 10 in the third magazine 92.

The first pre-breaking station 62 is modified compared to the variant of the first pre-breaking station 62 shown in FIGS. 8A to 8C in such a way that two different expansion dies 44*a* and 44*c* are available there, i.e., according to the nomenclature started above, the first expansion die 44*a* as well as a third expansion die 44*c*.

FIG. 9A shows the first expansion die 44*a* as the active expansion die 44 and the third expansion die 44*c* as the inactive expansion die 44. The active first expansion die 44*a* has as expansion tools 46 larger expansion cones 48 which are spaced further apart from each other. In contrast, the inactive third expansion die 44*c* has expansion cones 48 of a smaller diameter, and these expansion tools 46 are arranged closer together on the third expansion die 44*c*.

In the process phase according to FIG. 9A, the second handling robot 88 has removed a larger packaging blank 10 from the first magazine 66 and pressed it onto the upward-pointing expansion cones 48 of the first expansion die 44*a*. The gripper head 40 of the first handling robot 70 is also already located there in order to take the packaging blank 10*v* pre-treated in this way and to transfer it to the article grouping 20 provided on the horizontal conveyor device 60 of the feed device 4 and to press the packaging blank 10*v* onto the top of the articles 12 or cans 22 there.

In contrast, the third magazine 92 is inactive in the shown process phase, as is the third expansion die 44*c* whose expansion cones 48 point downwards without any function and cannot be reached in this way by the gripper head 40 of the second handling robot 88.

In contrast, FIG. 9B shows the third expansion die 44*c* as the active expansion die 44 and the first expansion die 44*a* as the inactive expansion die 44. The active third expansion die 44*c* has as expansion tools 46 smaller expansion cones 48 which are spaced less far apart from each other. In contrast, the inactive first expansion die 44*a* has expansion cones 48 of a larger diameter, wherein these expansion tools 46 are arranged further apart on the first expansion die 44*a*.

In the process phase according to FIG. 9B, the second handling robot 88 has removed a smaller packaging blank 10 from the third magazine 92 and pressed it onto the upward-pointing expansion cones 48 of the third expansion die 44*c*. The gripper head 40 of the first handling robot 70 is also already located there in order to take over the packaging blank 10*v* pre-treated in this way and to transfer it to the article grouping 20 provided on the horizontal conveyor device 60 of the feed device 4 and to press the packaging blank 10*v* onto the top of the articles 12 or cans 22 there.

As FIG. 9B schematically indicates, the articles 12 provided there on the horizontal conveyor 60 are smaller cans 22 so that the diameters of the through-openings of the packaging blank 10 must also be dimensioned smaller. In addition, the through-openings must be closer together and configured slightly differently because the overall arrangement of the article grouping 20 differs due to the smaller cans 22.

In contrast, the first magazine 66 is inactive in the process phase shown in FIG. 9B, as is the first expansion die 44*a* whose expansion cones 48 point downwards without any function and thus cannot be reached in this way by the gripper head 40 of the second handling robot 88.

Figure 9C:
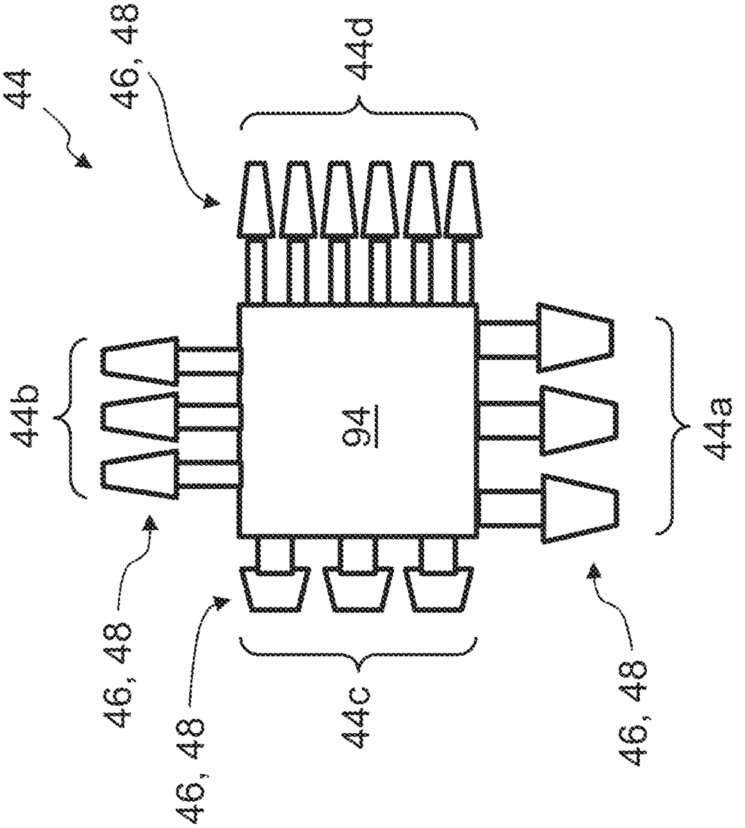
FIG. 9C shows an exemplary embodiment of a multi-part expansion die that has four sides, each with different configurations of expansion tools.

FIG. 9C also shows an exemplary embodiment of a multi-part expansion die 44 which has four sides, each with different configurations of expansion tools 46. Via a rotation of 90°, 180° or 270° around the center of their carrier element 94, the various expansion tools 46 can each be brought into the appropriate position in order to serve as an active expansion die 44 in the first or second pre-breaking station 62 or 64.

Thus, FIG. 9C shows a downward-pointing first expansion die 44*a* with three larger expansion cones 48 which form the expansion tools 46 according to the definition described here. A second expansion die 44*b* with three upward-pointing expansion cones 48, which are spaced closer together than in the first expansion die 44*a*, is located opposite this first expansion die 44*a* so that by rotating the carrier element 94 by 180°, it is possible to select between these two expansion dies 44*a* and 44*b*.

Furthermore, FIG. 9C shows a third expansion die 44*c* pointing to the left with three larger expansion cones 48 which form the expansion tools 46 according to the definition described here. The expansion cones 48 can have approximately the same spacings from one another as in the first expansion die 44*a*. However, these expansion cones 48 of the third expansion die 44*c* are shorter so that a different diameter variant of the through-openings can be pre-treated with them.

A fourth expansion die 44*c* with six expansion cones 48 pointing to the right, which are spaced closer together than in the other three variants 44*a*, 44*b* and 44*c*, lies opposite the third expansion die 44*c* so that by rotating the carrier element 94 by 180°, it is possible to select between these two expansion dies 44*c* and 44*d*.

The arrangements and dimensions of the four expansion dies 44*a*, 44*b*, 44*c* and 44*d* shown here are to be understood merely as examples, as is the respective number of visible expansion tools 46. The representation is basically intended to illustrate that exchangeable tools are conceivable which can be activated or deactivated as required in order to make the pre-breaking stations 62 and/or 64 more versatile to use.

Figure 9D:
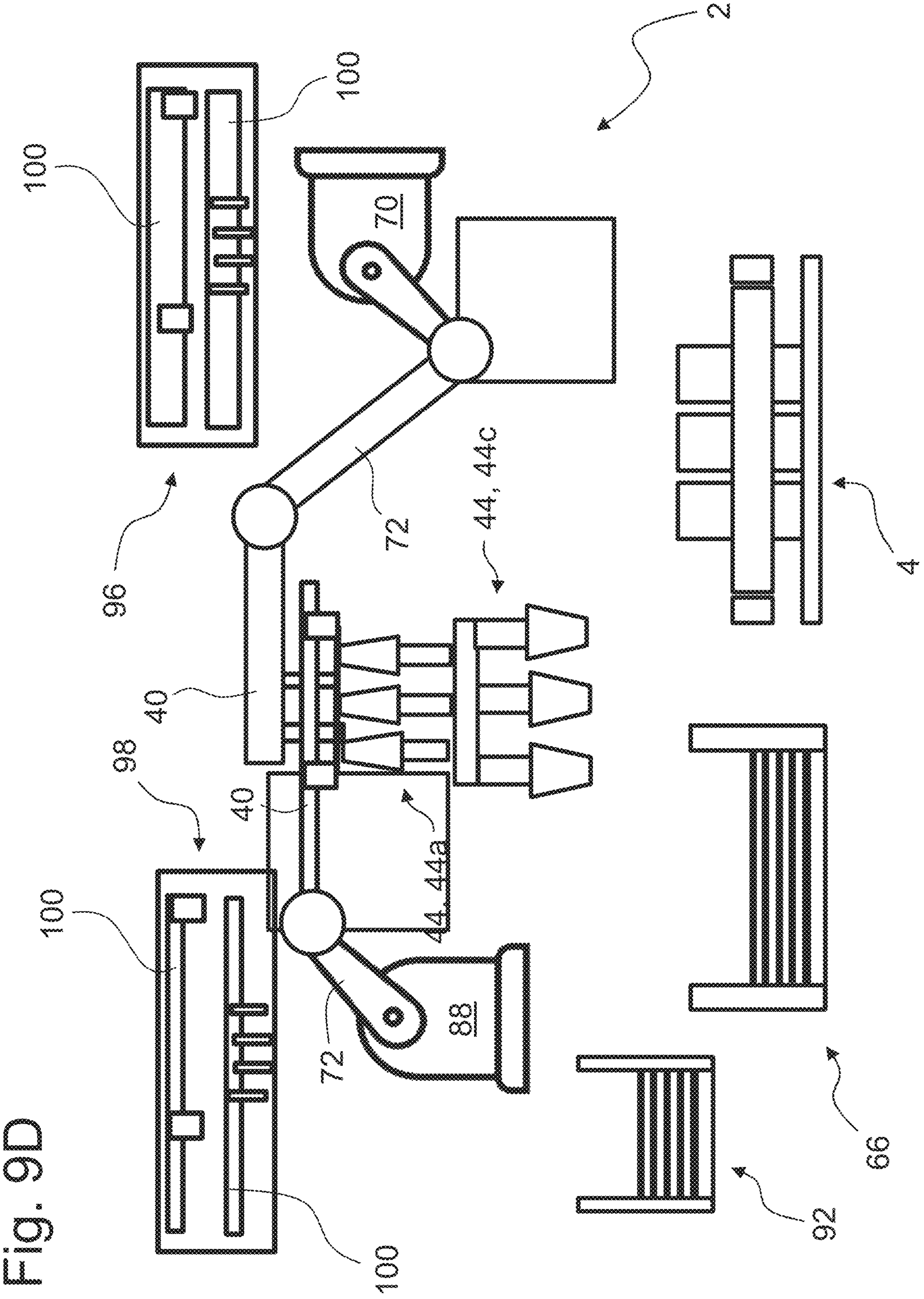
FIG. 9D shows a further variant of a pre-breaking station which is part of a pre-treatment module according to FIGS. 8A to 8C.

The schematic representation of FIG. 9D corresponds substantially to the variant of the first pre-breaking station 62 of the packaging apparatus 2 already shown in FIG. 9B, with the difference that the handling robots 70 and 88 shown there are each assigned their own tool change magazine 96 and 98, wherein these tool change magazines 96 and 98 each serve to store and provide different tools 100 for connection to the gripper heads 40 or for equipping the gripper heads 40 of the two handling robots 70 and/or 88.

The first handling robot 70 is assigned a first tool change magazine 96 which it can reach with its pivot arm 72 and in which various tools 100 can be kept ready which can be coupled in an automated or semi-automated manner to the gripper head 40 in order for example to be able to reliably grasp and handle differently dimensioned packaging blanks 10.

Such a tool change magazine can also be assigned to the second handling robot 88 that is designated here as the second tool change magazine 98. This second tool change magazine 98 must also be accessible by the pivot arm 72 of the second handling robot 88 so that the tools 100 held there can be coupled in an automated or semi-automated manner to the gripper head 40 of the second handling robot 88. This can also ensure that differently dimensioned packaging blanks 10, which the second handling robot 88 removes for example from the first magazine 66 or from the third magazine 92, can be reliably gripped and handled by the different tools 100.

With regard to the other components and functional elements that can be seen in FIG. 9D, reference is made to the illustration in FIG. 9B as well as the associated description.

The two schematic plan views of FIGS. 10 and 11 also show two different embodiment variants of the packaging apparatus 2 according to the invention, which may differ in some details from the embodiment variants of the packaging apparatus 2 shown in FIGS. 8A to 8C, but in many respects correspond to these embodiment variants, as will be examined in more detail below.

Figure 10:
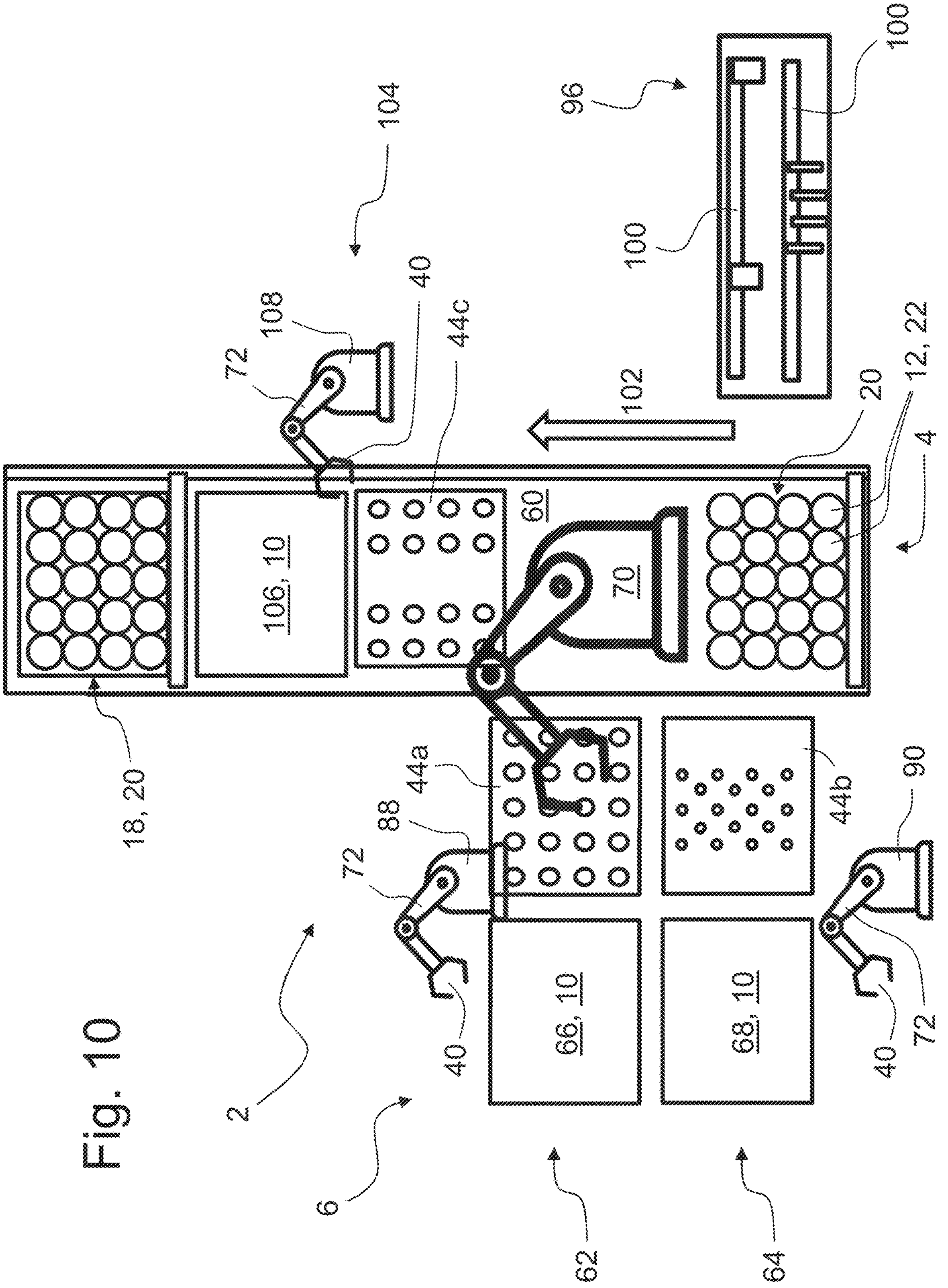
FIG. 10 shows a fourth embodiment variant of the packaging apparatus with a fourth configuration of handling robots.
Figure 11:
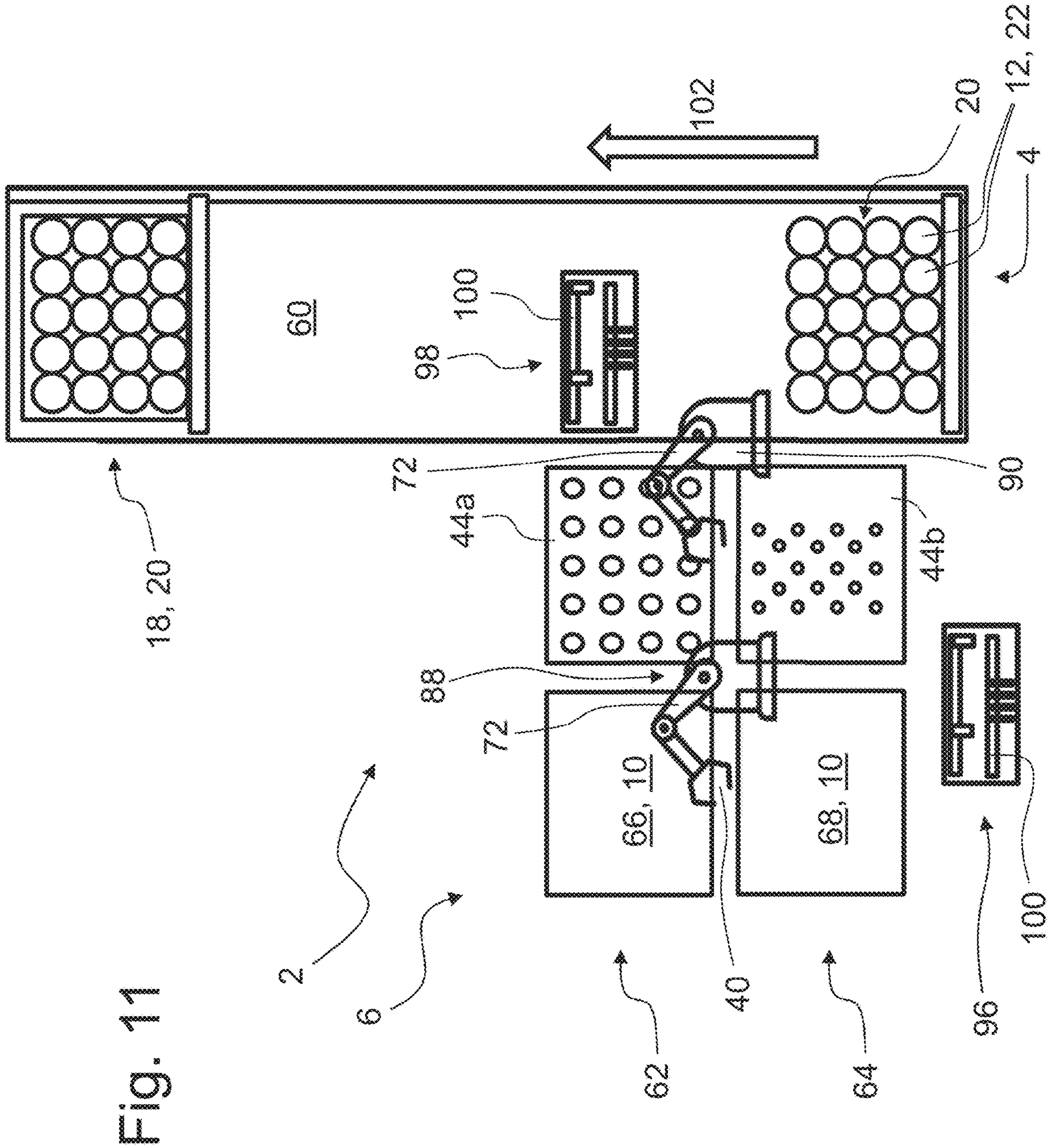
FIG. 11 shows a fifth embodiment variant of the packaging apparatus with a fifth configuration of handling robots.

In this regard, FIG. 10 can be regarded as a fourth embodiment variant of the packaging apparatus 2 according to the invention, while FIG. 11 can be regarded as a fifth embodiment variant of the packaging apparatus 2. In both embodiment variants, the feed device 4 for conveying the article groupings 20 in a defined conveying direction 102 can be seen on the horizontal conveyor device 60 provided for this purpose. The conveying direction 102 of the horizontal conveyor device 60 points from bottom to top in both illustrations.

In the fourth and fifth exemplary embodiments shown in FIGS. 10 and 11, the article groupings 20 conveyed on the horizontal conveyor device 60 of the feed device 4 each comprise twenty articles 12 or cans 22 which are grouped and combined in a rectangular arrangement so that the correspondingly configured packaging blanks 10 are kept ready and pre-treated for these article groupings 20 in order to be able to combine the groupings 20 into packaging units 18 in the manner described above.

The pre-treatment module 6 of the packaging apparatus 2 according to FIG. 10 comprises the first shown pre-breaking station 62 which is arranged on the left side of the feed device 4, as well as the second pre-breaking station 64 which is also located on the left side of the feed device 4 and, with respect to the conveying direction 102, below the first pre-breaking station 62. In the immediate vicinity of the first pre-breaking station 62, there is the first magazine 66 for a first variant of packaging blanks 10 which have not yet been pre-treated and whose through-openings can be punched there in a first arrangement (not shown here).

In the immediate vicinity of the second pre-breaking station 64, there is located the second magazine 68 for a second variant of packaging blanks 10 which have not yet been pre-treated and whose through-openings can each be punched there in a second arrangement (also not shown here), wherein the spacings and/or size of the through-openings of the packaging blanks 10 of the first magazine 66 can differ from the spacings and/or the sizes of the through-openings of the packaging blanks 10 of the second magazine 68, so that the packaging blanks 10 of the first magazine 66 which have not yet been treated are not suitable for being pre-treated with an expansion die 44 which is matched to the spacings and/or sizes of the packaging blanks 10 of the second magazine 68, and vice versa.

In order to remove the packaging blanks 10 from the first magazine 66 of the first pre-breaking station 62 and to feed them to the first expansion die 44*a* located in the vicinity thereof, in the fourth embodiment variant of the packaging apparatus 2 shown in FIG. 10, the second handling robot 88 is provided whose pivot arm 72 is preferably movable in multiple axes and has a suitably equipped gripper head 40 which is able to remove the packaging blanks 10 from the first magazine 66 and to feed them to the first expansion die 44*a*, which is suitable for them.

After pre-treatment in the first pre-breaking station 62, the pre-treated packaging blanks 10*v* can be placed onto the article grouping 20 provided on the horizontal conveyor 60 of the feed device 4 by the first handling robot 70 which is located in the vicinity of the horizontal conveyor 60 and in this case accesses the first pre-breaking station 62, in order to form the packaging units 18 in this way, as has already been described in detail above.

If the article grouping 20 transported on the horizontal conveyor 60 in the conveying direction 102 has a different configuration, it may be necessary to access the differently configured packaging blanks 10 from the second magazine 68 and thus to use the second pre-breaking station 64 as a whole.

In order to remove the packaging blanks 10 suitable for this purpose from the second magazine 68 of the second pre-breaking station 64 and to feed them to the second expansion die 44*a* located in the vicinity thereof, in the fourth embodiment variant of the packaging apparatus 2 shown in FIG. 10, the third handling robot 90 is provided, whose pivot arm 72 is preferably movable in multiple axes and has a suitably equipped gripper head 40 which is able to remove the packaging blanks 10 from the second magazine 68 and to feed them to the second expansion die 44*a* which is suitable for them.

After pre-treatment in the second pre-breaking station 64, the appropriately pre-treated packaging blanks 10*v* can be placed onto the article grouping 20 provided on the horizontal conveyor device 60 of the feed device 4 by the first handling robot 70 accessing the second pre-breaking station 64 in order to thus form the corresponding packaging units 18.

Thus, the fourth embodiment variant of the packaging apparatus 2 according to the invention shown in FIG. 10 is configured in such a way that the first handling robot 70 accesses at least the first pre-breaking station 62 as well as the second pre-breaking station 64 that take the packaging blanks 10*v* provided and pre-treated there on the corresponding expansion dies 44*a* or 44*b* and can place them on the article groupings 20 provided on the horizontal conveyor device 60.

Further expansion dies 44*c* and/or 44*d,* which are not assigned to the two pre-breaking stations 62 and/or 64 here, i.e. in particular third and/or fourth expansion dies 44*c* and/or 44*d,* can be used selectively according to the above description (see FIGS. 9A to 9D), for example alternating with the first and second expansion dies 44*a* and 44*b* provided in the first and/or second pre-breaking stations 62 and 64.

Furthermore, the pre-treatment module 6 of the packaging apparatus 2 according to FIG. 10 can have an optional third pre-breaking station 104 which can be arranged for example on the right side of the feed device 4. In the immediate vicinity of this optional third pre-breaking station 104, a third magazine 106 can be arranged for a third variant of packaging blanks 10 which have not yet been pre-treated and whose through-openings can be punched there in a third arrangement (not shown here). In this case, the spacings and/or size of the through-openings of the packaging blanks 10 of the third magazine 106 differ from the spacings and/or sizes of the through-openings of the packaging blanks 10 of the first magazine 66 as well as the second magazine 68 so that the packaging blanks 10 of the first and/or second magazine 66, 68 not yet treated are not suitable for being pre-treated with such an expansion die 44 that is matched to the spacings and/or sizes of the packaging blanks 10 of the first or second magazine 66, 68, and vice versa.

In order to remove the packaging blanks 10 from the third magazine 106 of the third pre-breaking station 106 and to feed them to a third expansion die 44*c* located in the vicinity thereof, in the fourth embodiment variant of the packaging apparatus 2 shown in FIG. 10, an optional fourth handling robot 108 is provided whose pivot arm 72, preferably movable in multiple axes, has a suitably equipped gripper head 40 which is able to remove the packaging blanks 10 from the third magazine 106 and to feed them to the third expansion die 44*c* suitable for them.

After pre-treatment has taken place in the third pre-breaking station 104, the pre-treated packaging blanks 10*v* can in turn be placed onto the article grouping 20 provided on the horizontal conveyor 60 of the feed device 4 by the first handling robot 70, which is located near the horizontal conveyor 60 and in this case possibly also accesses the third pre-breaking station 104, in order to form the packaging units 18 in this way, as has already been described in detail above.

Fourth expansion dies 44*d,* not shown in detail here, can be used selectively according to the above description (see FIGS. 9A to 9D), for example alternating with the first and second expansion dies 44*a* and 44*b* provided in the first and/or second pre-breaking stations 62 and 64, or also alternating with the third expansion die 44*c* provided in the third pre-breaking station 104.

It should be noted that each of the first, second and/or third pre-breaking stations 62, 64 and/or 104 shown in FIG. 10 can be considered as optional or as pre-breaking stations 62, 64 and/or 104 to be additionally provided. The arrangement and positioning of the available pre-breaking station 62, 64 and/or 104 can also be based on the space available on the packaging apparatus 2, and generally on the prevailing spatial conditions of the packaging apparatus 2. At least one of the three shown pre-breaking stations 62, 64 and/or 104 can optionally also be omitted if work can be done with two pre-breaking stations 62, 64 and/or 104, and/or if the expansion dies 44*a,* 44*b*, 44*c* and/or 44*d* are configured to be exchangeable or convertible, for example in the manner shown in FIGS. 9A to 9D.

In addition, the first handling robot 70 can optionally be assigned the first tool change magazine 96 illustrated in FIG. 10, which the first handling robot 70 can reach with its pivot arm 72, and in which various tools 100 can be kept ready, which can be coupled in an automated or semi-automated manner to the gripper head 40 of the first handling robot 70 in order for example to be able to reliably grasp and handle differently dimensioned packaging blanks 10.

The assignment of the tool change magazine 96, which is arranged in FIG. 10 on the right side of the horizontal conveyor device 60 and below the fourth handling robot 108 of the optional third pre-breaking station 104, to the first handling robot 70 can be configured in a corresponding manner, as already explained above with reference to FIG. 9D.

In addition, the fifth embodiment variant of the packaging apparatus 2 will be considered below, which is illustrated by the schematic plan view of FIG. 11. Again, the feed device 4 for conveying the article groupings 20 in a defined conveying direction 102 on the horizontal conveyor device 60 provided for this purpose can be seen there, wherein the conveying direction 102 of the horizontal conveyor device 60 points from bottom to top in the representation in FIG. 11.

In the fourth and fifth exemplary embodiments shown in FIGS. 10 and 11, the article groupings 20 conveyed on the horizontal conveyor device 60 of the feed device 4 each comprise twenty articles 12 or cans 22 which are grouped and assembled in a rectangular arrangement so that the correspondingly configured packaging blanks 10 are kept ready and pre-treated for these article groupings 20 in order to be able to combine the groupings 20 into packaging units 18 in the manner described above.

The pre-treatment module 6 of the packaging apparatus 2 according to FIG. 11 comprises the shown first pre-breaking station 62 which is arranged on the left side of the feed device 4, as well as the second pre-breaking station 64 which is also located on the left side of the feed device 4 and, with respect to the conveying direction 102, below the first pre-breaking station 62. In the immediate vicinity of the first pre-breaking station 62, there is the first magazine 66 for a first variant of packaging blanks 10 which have not yet been pre-treated and whose through-openings can be punched there in a first arrangement (not shown here).

In the immediate vicinity of the second pre-breaking station 64, there is located the second magazine 68 for a second variant of packaging blanks 10 which have not yet been pre-treated and whose through-openings can each be punched there in a second arrangement (also not shown here), wherein the spacings and/or size of the through-openings of the packaging blanks 10 of the first magazine 66 can differ from the spacings and/or the sizes of the through-openings of the packaging blanks 10 of the second magazine 68 so that the packaging blanks 10 of the first magazine 66 which have not yet been treated are not suitable for being pre-treated with an expansion die 44 which is matched to the spacings and/or sizes of the packaging blanks 10 of the second magazine 68, and vice versa.

In order to remove the packaging blanks 10 from the first magazine 66 of the first pre-breaking station 62 and to feed them to the first expansion die 44*a* located in the vicinity thereof, in the fifth embodiment variant of the packaging apparatus 2 shown in FIG. 11, the second handling robot 88 is provided whose pivot arm 72 is preferably movable in multiple axes and has a suitably equipped gripper head 40 which is able to remove the packaging blanks 10 from the first magazine 66 and to feed them to the first expansion die 44*a,* which is suitable for them.

The same second handling robot 88 is also provided and positioned accordingly to remove the packaging blanks 10 from the second magazine 68 of the second pre-breaking station 64 and to feed them to the second expansion die 44*b* located in the vicinity thereof. In order to be able to reach both pre-breaking stations 62 and 64 and both expansion dies 44*a* and 44*b* as well as the two magazines 66 and 68 equally, it is preferably provided in the fifth embodiment variant of the packaging apparatus 2 shown in FIG. 11 that the second handling robot 88 is positioned between the two pre-breaking stations 62 and 64, as the schematic representation of FIG. 11 illustrates. The pivot arm 72, preferably movable in multiple axes, of the second handling robot 88 also has the described gripper head 40 which is capable of removing the packaging blanks 10 from the first magazine 66 or from the second magazine 68 and feeding them to the first expansion die 44*a* or the second expansion die 44*b,* which are suitable for them.

After pre-treatment has taken place in the first pre-breaking station 62 or in the second pre-breaking station 64, the pre-treated packaging blanks 10*v* can be placed on the article grouping 20 provided on the horizontal conveyor 60 of the feed device 4 by the third handling robot 90, which is located in the vicinity of the horizontal conveyor 60 and in this case accesses both the first pre-breaking station 62 and the second pre-breaking station 64, in order to form the packaging units 18 in this way, as has already been described in detail above.

Thus, in the fifth embodiment variant of the packaging machine according to FIG. 11, the third handling robot 90 substantially fulfills the same tasks as the first handling robot 70 in the fourth embodiment variant of the packaging machine according to FIG. 10. In the variant according to FIG. 11, the third handling robot 90 is positioned in approximately the same way as the first handling robot 70 in the variant according to FIG. 10.

Which of the two pre-breaking stations 62 or 64 is accessed depends in each instance on the article grouping 20 currently being transported on the horizontal conveyor 60 in the conveying direction 102 as well as on its configuration.

Further expansion dies 44*c* and/or 44*d,* which are not assigned to the two pre-breaking stations 62 and/or 64 here, i.e. in particular third and/or fourth expansion dies 44*c* and/or 44*d,* can be used selectively according to the above description (see FIGS. 9A to 9D), for example alternating with the first and second expansion dies 44*a* and 44*b* provided in the first and/or second pre-breaking stations 62 and 64.

In addition, the second handling robot 88 can optionally be assigned the first tool change magazine 96 illustrated in FIG. 11, which the second handling robot 88 can reach with its pivot arm 72, and in which various tools 100 can be kept ready, which can be coupled in an automated or semi-automated manner to the gripper head 40 of the second handling robot 88 in order for example to be able to reliably grasp and handle differently dimensioned packaging blanks 10.

In addition, the third handling robot 90 can optionally also be assigned the second tool change magazine 98 shown in FIG. 11, which the third handling robot 90 can reach with its pivot arm 72, and in which various tools 100 can be kept ready, which can be coupled in an automated or semi-automated manner to the gripper head 40 of the third handling robot 90 in order for example to be able to reliably grasp and handle differently dimensioned packaging blanks 10.

Both the functional and spatial assignment of the first tool change magazine 96, arranged in FIG. 11 on the left side of the horizontal conveyor 60 and below the second pre-breaking station 64, to the second handling robot 88, and the functional and spatial assignment of the second tool change magazine 98, located in the proximity of the horizontal conveyor 60, to the third handling robot 90 can be configured in a corresponding manner, as already explained above with reference to FIG. 9D.

It should be noted at this point that the optional equipment of the packaging apparatus 2 according to FIGS. 8A to 8C, that may comprise an optical sensor device 78 which may in particular be formed by a camera 80 with downstream image analysis, can also be present in the fourth and fifth embodiment variants of the packaging apparatus 2 according to FIG. 10 and/or FIG. 11. This optional optical sensor device 78 or camera 80 with its downstream image analysis can be assigned to the horizontal conveyor device 60. Its task can in particular be to monitor the finished packaging units 18 equipped with the pre-treated packaging blanks 10*v,* wherein the image analysis can in particular be aimed at checking whether all tabs on the through-openings of the packaging blanks 10 are correctly engaged and/or whether the packaging blank is locked in the intended manner with the articles 12 or cans 22 and is located in the intended horizontal plane.

As already explained above, the optional optical sensor device 78 or camera 80 delivers its image signals 82 in particular to the control center 74 in which the image analysis suitable for this purpose can be located in order to obtain the desired or required information about the condition of the finished packaging units from the image signals 82 (see FIGS. 8A to 8C).

In addition, the control center 74 (not shown in FIGS. 10 and 11) can optionally be connected to an external data storage device 84 which can be formed for example by a data cloud 86. That which was stated above also applies here so that the control center 74 as well as the device 84 or 86 data-linked thereto can also be part of the packaging apparatus 2 according to FIGS. 10 and 11 as already explained above with reference to FIGS. 8A to 8C.

The invention has been described with reference to a preferred embodiment. However, it is conceivable for a person skilled in the art that modifications or changes can be made to the invention without departing from the scope of protection of the following claims.

LIST OF REFERENCE SIGNS

2 packaging apparatus
4 feed apparatus
6 pre-treatment module, apparatus for pre-treatment of packaging blanks
8 packaging module
10 packaging blank
12 article
14 through-opening
14*v* pre-treated through-opening
16 edge region (of the through-opening)
16*v* pre-treated edge region
16*e* heated edge region
18 packaging unit, bundle
20 Article grouping, article compilation
22 can, beverage can
24 lid rim
26 tapering, constriction
28 shell surface

30 closure, can closure
32 fixing tabs
34 radial incision, radial incisions
36 narrow incision, narrow incisions
38 sub-regions
40 gripper head
42 magazine
44 expansion die
44*a* first expansion die
44*b* second expansion die
44*c* third expansion die
44*c* fourth expansion die
46 expansion tool
48 expansion cone
50 vacuum unit
52 tool
54 press punch
56 additional gripper head
58 vacuum unit
60 horizontal conveyor device
62 first pre-breaking station
64 second pre-breaking station
66 first magazine
68 second magazine
70 first handling robot
72 pivot arm, movable pivot arm
74 control center
76 control signals
78 optical sensor device
80 camera
82 image signals
84 Data storage facility
86 data cloud
88 second handling robot
90 third handling robot
92 third magazine
94 Support element
96 first tool change magazine
98 second tool change magazine
100 tools
102 conveying direction
104 third pre-breaking station
106 third magazine
108 fourth handling robot
F application force, joining force
d14 mean diameter (of the through-opening)
d14*v* mean diameter of the pre-treated through-opening

The invention claimed is:

1. An apparatus (6) for the pre-treatment of packaging blanks (10), each of which has at least one through-opening (14) within a flat region for receiving at least one article (12) to form a packaging unit (18) having the at least one article (12) and the packaging blank (10) connected thereto, comprising:

- at least two different expansion dies (44; 44*a*, 44*b*, 44*c*, 44*d*) that weaken the at least one through-opening (14) of the packaging blank (10),
- wherein the at least two expansion dies (44; 44*a*, 44*b*, 44*c*, 44*d*) each comprise expansion tools (46) with different opening widths or different contours for respectively influencing the extent of the weakening of the at least one through-opening (14), and
- at least one handling robot (70, 88, 90, 108) adapted to apply the packaging blank (10) to the at least one of the at least two available expansion dies (44; 44*a*, 44*b*, 44*c*, 44*d*).

2. The apparatus (6) of claim 1, wherein at least one handling robot (88, 90; 108) is assigned to each of the at least two different expansion dies (44; 44*a*, 44*b*, 44*c*, 44*d*).

3. The apparatus (6) of claim 1, wherein at least one handling robot (70) is a common handling robot assigned to the at least two different expansion dies (44; 44*a*, 44*b*, 44*c*, 44*d*).

4. The apparatus (6) of claim 1, wherein each of the at least two expansion dies (44; 44*a*, 44*b*, 44*c*, 44*d*) is equipped with a plurality of expansion tools (46).

5. The apparatus (6) of claim 4, wherein the plurality of expansion tools (46) of different dies (44; 44*a*, 44*b*, 44*c*, 44*d*) are each differently dimensioned.

6. The apparatus (6) of claim 1, wherein each of the at least two expansion dies (44; 44*a*, 44*b*, 44*c*, 44*d*) is assigned to a pre-breaking station (62, 64, 104) adapted to pre-treat different packaging blanks (10), and each of the at least two expansion dies (44; 44*a*, 44*b*, 44*c*, 44*d*) forms a part of the pre-breaking station (62, 64, 104).

7. The apparatus (6) of claim 6, wherein at least one of the pre-breaking stations (62, 64, 104) is equipped with a pivotable or rotatable tool carrier (94), wherein at least two different expansion dies (44; 44*a*, 44*b*, 44*c*, 44*d*) can be brought into engagement with the packaging blanks (10) as active expansion dies (44; 44*a*, 44*b*, 44*c*, 44*d*).

8. The apparatus (6) of claim 6, wherein the at least one handling robot (70, 90) is arranged between the at least two pre-breaking stations (62, 64, 104) and a provisioning station or a conveyor device (4, 60) with article groupings (20) located thereon, and wherein the at least one handling robot (70, 90) is adapted to transfer packaging blanks (10, 10*v*), pre-treated in the pre-breaking stations (62, 64, 104), to article groupings (20) and adapted to apply the pre-treated packaging blanks (10*v*) to article groupings (20).

9. The apparatus (6) according to claim 6, where a separate handling robot (88, 90) is arranged between each of the at least two pre-breaking stations (62, 64, 104) and the provisioning station or the conveyor device (4, 60) with article groupings (20) located thereon, wherein the handling robots are adapted to transfer packaging blanks (10, 10*v*), pre-treated in the different pre-breaking stations (62, 64, 104), to article groupings (20) and adapted to apply the pre-treated packaging blanks (10*v*) to article groupings (20).

10. A method for the pre-treatment of packaging blanks (10), each of which has at least one through-opening (14) within a flat region for receiving at least one article (12) to form a packaging unit (18), having the at least one article (12) and the packaging blank (10) connected thereto, comprising:

- pre-treating a packaging blank (10) to weaken at least one through-opening (14) to reduce a joining force (F) when applying the packaging blank (10, 10*v*) to at least one article (12) passing through the through-opening (14), by using
- at least one of at least two different expansion dies (44; 44*a*, 44*b*, 44*c*, 44*d*), each having different contours or expansion dimensions.

11. The method of claim 10, in which the at least two different expansion dies (44; 44*a*, 44*b*, 44*c*, 44*d*) are each brought together with packaging blanks (10) to be pre-treated by at least one separate handling robot (70, 88, 90, 108).

12. The method of claim 10, wherein the at least two different expansion dies (44; 44*a*, 44*b*, 44*c*, 44*d*) are each brought together, by a common handling robot (70, 88), with packaging blanks to be pre-treated.

13. The method claim 10, wherein each of the at least two different expansion dies (44; 44*a*, 44*b*, 44*c*, 44*d*) is assigned to a pre-breaking station (62, 64, 104) for pre-treating different packaging blanks (10) in each case, and each of the at least two expansion dies (44: 44*a*, 44*b*, 44*c*, 44*d*) forms a part of the pre-breaking station (62, 64, 104).

14. The method of claim 13, further comprising transferring the packaging blanks (10, 10*v*), pre-treated in the pre-breaking stations (62, 64, 104), by at least one separate handling robot (88, 90) from the at least two pre-breaking stations (62, 64, 104) to a provisioning station or a conveyor device (4, 60) with article groupings (20) located thereon and applying the packaging blanks (10, 10*v*) to the article groupings (20), wherein each of the separate handling robots (88, 90) can access the one of the at least two pre-breaking stations (62, 64, 104) to which it is assigned.

15. The method of claim 13, further comprising transferring the packaging blanks (10, 10*v*), pre-treated in each of the pre-breaking stations (62, 64, 104), by at least one common handling robot (70, 90) from the at least two pre-breaking stations (62, 64, 104) to a provisioning station or a conveyor device (4, 60) with article groupings (20) located thereon and applying the packaging blanks (10, 10*v*) to the article groupings (20), wherein the common handling robot (70, 90) can selectively access one of the at least two pre-breaking stations (62, 64, 104).

16. The method of claim 10, wherein during a production run, different packaging units (18) can be produced which are equipped with differently configured or pre-treated packaging blanks (10).

17. The method of claims 10, wherein during a production run, identical packaging units (18) are produced which are equipped exclusively with packaging blanks (10, 10*v*) which are of the same structure or pre-treated within one of a plurality of pre-breaking stations (62, 64, 104).

18. A packaging apparatus (2) for producing packaging units (18) which are formed by at least one article (12) and a packaging blank (10) connected thereto, wherein when connected to the packaging blank (10), at least portions of the at least one article (12) pass through a through-opening (14) in a flat region of the packaging blank (10), which packaging apparatus (2) comprises:

a feed device (4) for at least one article (12) or for combinations of a plurality of grouped articles (12), a pre-treatment module (6) for pre-treatment of the packaging blanks (10) for application to the at least one article (12), a packaging module (8) for applying and fixing the pre-treated packaging blank (10, 10*v*) to the at least one article (12), wherein the pre-treatment module (6) has at least two expansion dies (44; 44*a*, 44*b*, 44*c*, 44*d*), each having differently dimensioned or contoured expansion tools (46), wherein the at least two expansion dies (44; 44*a*, 44*b*, 44*c*, 44*d*) are each adapted for weakening the at least one through-opening (14) of the packaging blank (10), and wherein the pre-treatment module (6) further comprises at least one handling robot (70, 88, 90, 108) adapted to apply the packaging blank (10) to the at least one of the at least two available expansion dies (44; 44*a*, 44*b*, 44*c*, 44*d*).

19. The packaging apparatus (2) of claim 18, further comprising an optical sensor device (78) with downstream image analysis for monitoring the application of the packaging blanks (10) on the article groupings (20).

20. The packaging apparatus (2) of claim 19, further comprising a control center (74) for controlling various system functions, coupled to a data storage device (84) which collects and keeps available sensor data obtained in the packaging apparatus (2), and which provides the stored sensor data or operating and system parameters of the packaging apparatus (2) for influencing system functions.

* * * * *